United States Patent
Lo et al.

(10) Patent No.: US 10,565,779 B2
(45) Date of Patent: Feb. 18, 2020

(54) APPARATUSES, METHODS AND SYSTEMS FOR PRE-WARPING IMAGES FOR A DISPLAY SYSTEM WITH A DISTORTING OPTICAL COMPONENT

(71) Applicant: Meta View, Inc., San Mateo, CA (US)

(72) Inventors: Raymond Chun Hing Lo, Richmond Hill (CA); Joshua Hernandez, Half Moon Bay, CA (US); Valmiki Rampersad, San Mateo, CA (US); Agis Mesolongitis, Portola Valley, CA (US); Ali Shahdi, Portola Valley, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 16/027,851

(22) Filed: Jul. 5, 2018

(65) Prior Publication Data

US 2019/0156555 A1   May 23, 2019

Related U.S. Application Data

(63) Continuation of application No. 15/400,956, filed on Jan. 6, 2017, now Pat. No. 10,043,305.

(60) Provisional application No. 62/275,776, filed on Jan. 6, 2016.

(51) Int. Cl.
| | |
|---|---|
| *G06T 15/06* | (2011.01) |
| *G06T 15/20* | (2011.01) |
| *G06T 5/00* | (2006.01) |
| *G06T 19/00* | (2011.01) |
| *G02B 27/22* | (2018.01) |
| *G06T 3/00* | (2006.01) |
| *G02B 27/01* | (2006.01) |

(52) U.S. Cl.
CPC ........ *G06T 15/205* (2013.01); *G02B 27/2271* (2013.01); *G06T 3/0093* (2013.01); *G06T 5/001* (2013.01); *G06T 5/006* (2013.01); *G06T 19/006* (2013.01); *G02B 2027/0174* (2013.01)

(58) Field of Classification Search
CPC ... G06T 15/205; H04N 13/261; H04N 13/128
USPC .......................................................... 345/633
See application file for complete search history.

(56) References Cited

U.S. PATENT DOCUMENTS

| | | | |
|---|---|---|---|
| 6,249,289 B1 | 6/2001 | Arnaud et al. | |
| 6,326,964 B1 | 12/2001 | Snyder et al. | |
| 9,720,505 B2 | 8/2017 | Gribetz et al. | |
| 10,043,305 B2 | 8/2018 | Lo et al. | |
| 10,186,301 B1 * | 1/2019 | van Hoff ................ | G11B 27/34 |

(Continued)

OTHER PUBLICATIONS

International Search Report, PCT/US2017/012643, dated Apr. 4, 2017, 2 Pages.
Written Opinion, PCT/US2017/012643, dated Apr. 4, 2017, 6 Pages.

*Primary Examiner* — Thomas J Lett
(74) *Attorney, Agent, or Firm* — Andrew Bodendorf

(57) ABSTRACT

Aspects of the disclosed apparatuses, methods and systems provide elimination of distortion induced by an optical system that reflects light from an image source. An inverse mapping of the distortion is created for the optical system. The display system applies the inverse mapping to an image prior to display to introduce a distortion to the displayed image that is the inverse of the distortion introduced by the optical system. As a result, the distortion in the displayed image is canceled by the distortion of the optical element providing the user with an image that is substantially distortion free.

19 Claims, 20 Drawing Sheets

(56) References Cited

U.S. PATENT DOCUMENTS

| | | |
|---|---|---|
| 2008/0101711 A1 | 5/2008 | Kalker et al. |
| 2008/0143978 A1 | 6/2008 | Demera-Venkata et al. |
| 2009/0077504 A1 | 3/2009 | Bell et al. |
| 2010/0027908 A1 | 2/2010 | Kokemohr |
| 2011/0066658 A1 | 3/2011 | Rhoads et al. |
| 2012/0113223 A1 | 5/2012 | Hilliges et al. |
| 2013/0002591 A1 | 1/2013 | Whytock et al. |
| 2013/0063576 A1* | 3/2013 | Okubo ............... G02B 27/2214 348/51 |
| 2013/0208014 A1* | 8/2013 | Fleck ................. G06K 9/00684 345/672 |
| 2015/0235438 A1 | 8/2015 | Schowengerdt |
| 2015/0241698 A1 | 8/2015 | Schowengerdt |
| 2016/0155019 A1 | 6/2016 | Kim et al. |
| 2016/0307482 A1 | 10/2016 | Huang et al. |

* cited by examiner

APPARATUSES, METHODS AND SYSTEMS FOR PRE-WARPING IMAGES FOR A DISPLAY SYSTEM WITH A DISTORTING OPTICAL COMPONENT

CROSS-REFERENCE TO RELATED APPLICATIONS

This application is a continuation of U.S. patent application Ser. No. 15/400,956 titled "APPARATUSES, METHODS AND SYSTEMS FOR PRE-WARPING IMAGES FOR A DISPLAY SYSTEM WITH A DISTORTING OPTICAL COMPONENT" filed Jan. 6, 2017, which claims the benefit under 35 U.S.C. § 119(e) of U.S. Provisional Application No. 62/275,776, titled "APPARATUSES, METHODS AND SYSTEMS RAY-BENDING: SUB-PIXEL-ACCURATE PRE-WARPING FOR A DISPLAY SYSTEM WITH ONE DISTORTING MIRROR" filed on Jan. 6, 2016 in the U.S. Patent and Trademark Office, both of which are herein expressly incorporated by reference in their entirety for all purposes.

BACKGROUND

Compact display systems may include an optical element. In one example, the optical element may reflect or partially reflect light from one or more light sources, such as for example, a display device. The reflected or partially reflected light is viewed by a user and perceived as an image.

However, the optical element can induce a certain amount of distortion or "warp" in the image, which is perceived by the viewer of the display Eliminating this distortion is often desired, especially in applications, such as Augmented Reality, where virtual objects presented by the display system are perceived to lie at desired points in space. For example, a virtual clock may be desired to be located on a table within a room. However, the distortion introduced may cause the virtual clock to be perceived by the viewer as being located at an undesired location (e.g., floating above the table). In addition, when a user interacts with virtual objects, for example, when the user attempts to touch or otherwise manipulate a virtual object, distortion may increase the difficulty of the user accurately locate and/or interact with the virtual object. In order to compensate for this problem, some display systems attempt to rectify the output image by eliminating distortion induced by the optical system by providing additional optics to straighten or eliminate the distortion. However, such attempts add expense and complexity to the display system. In addition, providing additional optics tends to increase the size of the display system, making the system bulky, unwieldy, and/or uncomfortable for extended wear by a user.

SUMMARY

Aspects of the disclosed apparatuses, methods, and systems describe various methods, system, components, and techniques provide apparatuses, methods, systems, components and techniques for eliminating distortion induced by an optical system that reflects light from an image source. For example, in an augmented or virtual reality display system, light from one or more image sources (e.g., a display device) is reflected or partially reflected by one or more optical elements (e.g., an optical combiner) towards the eyes of a user. However, the optical element may introduce distortion to the reflected image seen by the user of the display system. In order to provide an image that is distortion free, the display system distorts or "pre-warps" the image presented by the image source prior to reflection by the optical system, such that the distortion introduced by the optical system cancels, corrects, mitigates, and/or eliminates the distortion introduced by the pre-warped image. As a result, the user is provided with an image that is perceived as being distortion free.

As described according to various examples and embodiments described herein, a sub-pixel, pre-warped image is computed for an optical geometry of a display system having only a single reflection of the image from the image source to an eye of a viewer. The pre-warped image is computed by determining an accurate model of the geometry of the optical element of the display system. For example, a digital mesh or a lattice modeling the geometry, the shape, and/or the contour of the optical element is determined. In addition, the position and attitude of the viewer of the display system and the position of the image source relative to the optical element is precisely determined to create a forward distortion map. The forward distortion map is then used to compute a distortion map for the optical element. The display system applies the distortion map to an image displayed by the image source of the display system to create a distorted or pre-warped image for presentation by the display system having a distortion that is the inverse of the distortion of the corresponding to the optical element of the display system. When the distorted image generated by the display device is reflected by the optical element, the distortion is cancelled, mitigated, corrected, and/or eliminated by the optical element. As a result, the image viewed by the user of the display system is perceived by the user as being distortion free.

In one general aspect, a computer implemented method of reducing a first optical distortion introduced by an optical element arranged to reflect light from an image source to a viewer of an optical display system. The method includes receiving, by a processing device, image data for display by the optical display system; receiving, by the processing device; an inverse distortion map corresponding to the optical element; rendering, by the processing device, the image data to an image source display buffer prior to display according to coordinates indicated by the inverse distortion map to create an image with a second optical distortion; displaying the created image with the second optical distortion read from the display buffer by the image source, wherein a viewer of the optical display system perceives an image that is substantially distortion free.

The first optical distortion may be substantially the inverse of the second optical distortion.

The rendering operation may further include the operations: sampling the inverse distortion map at the coordinates for each pixel of the image; determining a pair of image plane coordinates corresponding to the sampled inverse distortion map; and sampling the image at the determined image plane coordinates to generate portion of the image for display by the image source. The operations may be performed with sub-pixel accuracy.

The inverse distortion map may comprise a two-channel, floating-point texture whose values range over the field of view of the viewer of the optical system.

The processing device may be a graphics processing unit implementing a graphics rendering pipeline. The graphics processing unit may apply the inverse distortion map to the image data using a shading process.

The inverse distortion map may include a first inversion map for a first dimension of image plane coordinates and a second inversion map for a second dimension of image plane coordinates.

In another general aspect, an optical display system reducing a first optical distortion introduced by an optical element arranged to reflect light from an image source to a viewer of the optical display system; the system comprising: one or more storage devices, at least one of the storage devices storing image data, at least one of the storage devices storing an inverse distortion map, and at least one of the storage devices storing computer readable instructions; one or more processing devices operatively coupled to the one or more storage devices to read the image data, inverse distortion map, and execute the instructions, the instructions configured to cause the one or more processing devices to: receive the image data for display by the optical display system; receive the inverse distortion map corresponding to the optical element; render the image data to an image source display buffer prior to display according to coordinates indicated by the inverse distortion map to create an image with a second optical distortion; displaying the created image with the second optical distortion read from the display buffer by the image source, wherein the viewer of the optical display system perceives an image that is substantially distortion free.

The first optical distortion may be substantially the inverse of the second optical distortion.

The instructions may be further configured to cause the one or more processing devices to: sample the distortion map at the coordinates for each pixel of the image; determine a pair of image plane coordinates corresponding to the sampled distortion map; and sample the image at the determined image plane coordinates to generate a portion of the image for display by the image source. The sampling operations are performed with sub-pixel accuracy.

The inverse distortion map may comprise a two-channel, floating-point texture whose values range over the field of view of the viewer of the optical system.

At least one of the one or more processing devices may be a graphics processing unit implementing a graphic rendering pipeline. The graphics processing unit may apply the inverse distortion map to the image data using a shading process.

The inverse distortion map may a first inversion map for a first dimension of image plane coordinates and a second inversion map for a second dimension of image plane coordinates.

The system may also include the image source; and the optical element.

The optical display system may be a virtual reality or augmented reality head mounted display.

In another general aspect, a method of creating an inverse distortion map to reverse a first optical distortion introduced by an optical element arranged to reflect light from an image source to a viewer of an optical display system; the method comprising: determining a virtual mesh mapping the optical geometry of a reflective surface of the optical element of the optical display system; determining a position and an attitude of one or more eyes of a viewer of the optical system and the image source relative to the optical component; computing a forward distortion map from the virtual mesh, positions and attitudes, that maps the first optical distortion for a viewer of the optical display system; and computing the inverse distortion map for the optical component of the optical display system from the forward distortion map The inverse distortion map may embody a second optical distortion that is substantially the inverse of the first optical distortion.

The virtual mesh may be a lattice including a plurality of vertices representing the shape or contour of a reflective surface of the optical element.

The virtual mesh may be created in perspective according to a pinhole visual model described in the last section, and the mesh is rendered in image plane coordinates The method may further include creating a position map and a normal map from the virtual mesh.

The method may further include, for each vertex in the virtual mesh, determining a position and a corresponding normal vector.

Computing the forward distortion map may further comprise computing a composition of the vector-valued positions expressed as a composition of vector-valued positions and normal images.

Computing the inverse distortion map may include computing a first inversion map for a first dimension of image plane coordinates and computing a second inversion map for a second dimension of image plane coordinates.

The details of various embodiments are set forth in the accompanying drawings and the description below. Other features and advantages will be apparent from the following description, the drawings, and the claims.

BRIEF DESCRIPTION OF DRAWINGS

The following description illustrates aspects of embodiments of the disclosed apparatuses, methods, and systems in more detail, by way of examples, which are intended to be non-limiting and illustrative with reference to the accompanying drawings, in which.

DETAILED DESCRIPTION

Figure 1A:
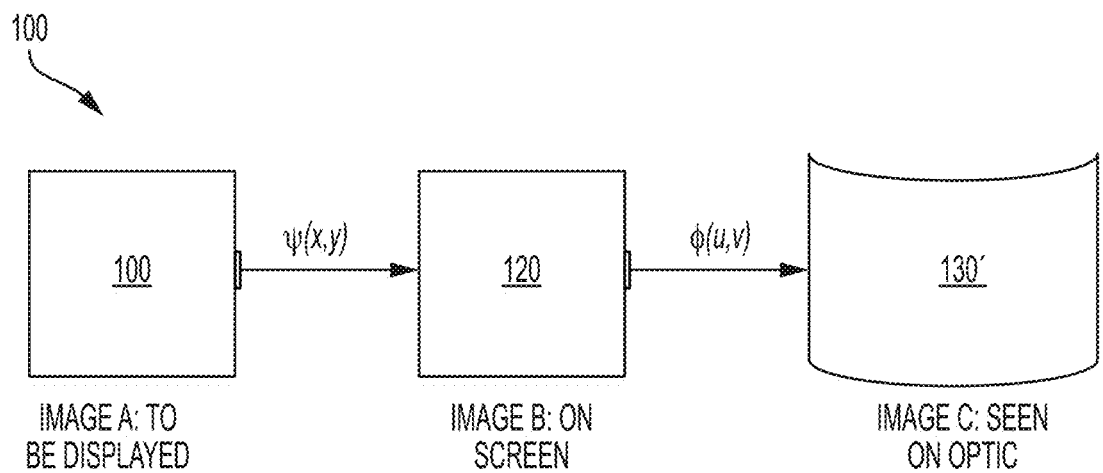
FIGS. 1A and 1B illustrate an example of a warping and an unwarping process.

The following detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims, which expressly states otherwise. It is understood that "at least one" is equivalent to "a."

The aspects (examples, alterations, modifications, options, variations, embodiments, and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments, which are not described, may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

Distortion

Compact display systems, for example, head mounted displays, may include an optical element. In one example, the optical element may reflect or partially reflect light from one or more light sources, such as for example, a display. The reflected or partially reflected light is viewed by a user and perceived as an image.

In one example, an optical element of a display system may have a contour and/or curvature (e.g., a prescription or a power) to expand the field-of-view (FOV) of a user of the display system. As a result, the optical element can induce a certain amount of distortion or "warp" in the image presented to the viewer of the display Eliminating this distortion is often desired, especially in applications, such as Augmented Reality, where virtual objects presented by the display are perceived to lie at desired points in space. For example, a virtual clock may be desired to be located on a table within a room. However, the distortion introduced may cause the virtual clock to be perceived by the viewer as being located at an undesired location (e.g., floating above the table). In addition, when a user interacts with virtual objects, for example, when the user attempts to touch or otherwise manipulate a virtual object, distortion may increase the difficulty of the user accurately locate and/or interact with the virtual object. In order to compensate for this problem, some display systems attempt to rectify the image output from the system by eliminating distortion induced by the optical system by providing additional optics to straighten or eliminate the distortion. However, such attempts add expense and complexity to the display system. In addition, such attempts tend to increase the size of the display system, making the system bulky, unwieldy, and/or uncomfortable for extended wear by a user.

Overview

The following description provides apparatuses, methods, systems, components, and techniques for eliminating distortion induced by an optical system that reflects light from an image source. For example, in an augmented or virtual reality display system, light from one or more image sources (e.g., a display device) is reflected or partially reflected by one or more optical elements (e.g., an optical combiner) towards the eyes of a user. However, the optical element may introduce distortion to the reflected image seen by the user of the display system. In order to provide an image that is distortion free, the display system distorts or "pre-warps" the image presented by the image source prior to reflection by the optical system, such that the distortion introduced by the optical system cancels, corrects, mitigates, and/or eliminates the distortion introduced by the pre-warped image. As a result, the user is provided with an image that is perceived as being distortion free.

As described according to various examples and embodiments described herein, a sub-pixel, pre-warped image is computed for an optical geometry of a display system having only a single reflection of the image from the image source to an eye of a viewer. The pre-warped image is computed by determining an accurate model of the geometry of the optical element of the display system. For example, a digital mesh or a lattice modeling the geometry, the shape, and/or the contour of the optical element is determined. In addition, the position and attitude of the viewer of the display system and the position of the image source relative to the optical element is precisely determined to create a forward distortion map. The forward distortion map is a function $f(x,y)=(u,v)$ from homogeneous eye coordinates ("image plane coordinates") to pixel coordinates of the display. The map indicates, for any ray of light entering the eye (parameterized, e.g., by azimuth and elevation angles), which screen pixel (or what mixture of pixels) contributed to the color (e.g. RGB intensity) of that light. The forward distortion map is then used to compute a distortion map that is the inverse of the distortion introduced by the optical element of the display system. The display system applies the distortion map to an image displayed by the image source of the display system to create a distorted or pre-warped image for presentation by the display system having a distortion that is the inverse of the distortion of the corresponding optical element of the display system. When the distorted image generated by the display device is reflected by the optical element and viewed by a user, the distortion is cancelled, mitigated, corrected, and/or eliminated by the optical element. As a result, the image viewed by the user of the display system is perceived by the user as being distortion free.

Unwarping Process

Figure 1B:
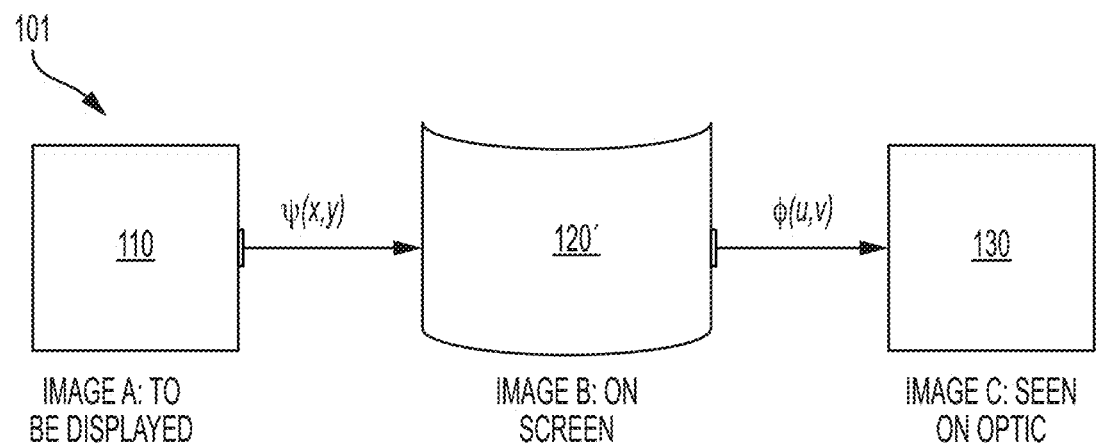

FIG. 1A illustrates an example of a warping process 100 in a display system, and FIG. 1B illustrates an example of a complementary unwarping process 101 for the display system.

In one general aspect, the human eye of a user of a display system can be modelled as a camera that observes the distortion produced by the optical element of the display system. This model is used to derive a function describing the optical element that is optimal for the user wearing the display system. For example, in one embodiment as shown in FIGS. 1A and 1B, an image A (e.g., 110) is an image to be displayed by the system; an image B (e.g., 120 and 120') is the image the displayed by the image source of the display system (e.g., a display device); and an image be C (e.g., 130' and 130) is the image seen by the user after being reflected by the optical element of the display system.

As shown in FIG. 1A, the image C seen by the user has been distorted by the optical element and the viewer of image perceives a distorted image 130'. As shown in FIG. 1B, the image B 120' provided by the display device is distorted; however, the image C 130 seen by the user is perceived as undistorted, because the distortion of image B 120' has been removed, corrected, and/or canceled by the distortion of introduced by the optical element. In this example, the warping or distortion caused by the optical element is described by a function: $\phi(u,v)$. The display is described by the function: $\psi(x,y)$. The variable set $(u,v)$ represents pixel coordinates of the display device, and the variable set $(x,y)$ represents homogeneous coordinates in a plane of the image to be presented by the display device. According to the examples and embodiments provided herein, a pre-warping function $\psi(x,y)$ is determined and applied such that the images A≡C and the image perceived by the viewer is distortion free.

For conciseness and clarity of explanation, the following description and corresponding figures illustrate examples and embodiments with regard to one of the eyes of a viewer; however, one skilled in the art will appreciate that the warping and unwarping effects may be equally applied with respect to both eyes of a user, for example, in a stereoscopic or binocular display system in which the optical element creates a distortion of the image as perceived by both eyes. For example, the functions, the techniques, the methods, and the components, provided below may be performed with respect to images presented by the system to both eyes a viewer to mitigate, correct, and/or eliminate distortion introduced by the optical element of the display system. In one example, for a system having symmetrical optical elements for both eyes, for example, where the curvature of the optical element for one eye mirrors the curvature of the optical element for the other eye through a plane orthogonal to a straight line drawn between the eyes, the warping and unwarping may be mirrored through this orthogonal plane.

Pinhole Reflection Model

Figure 2:
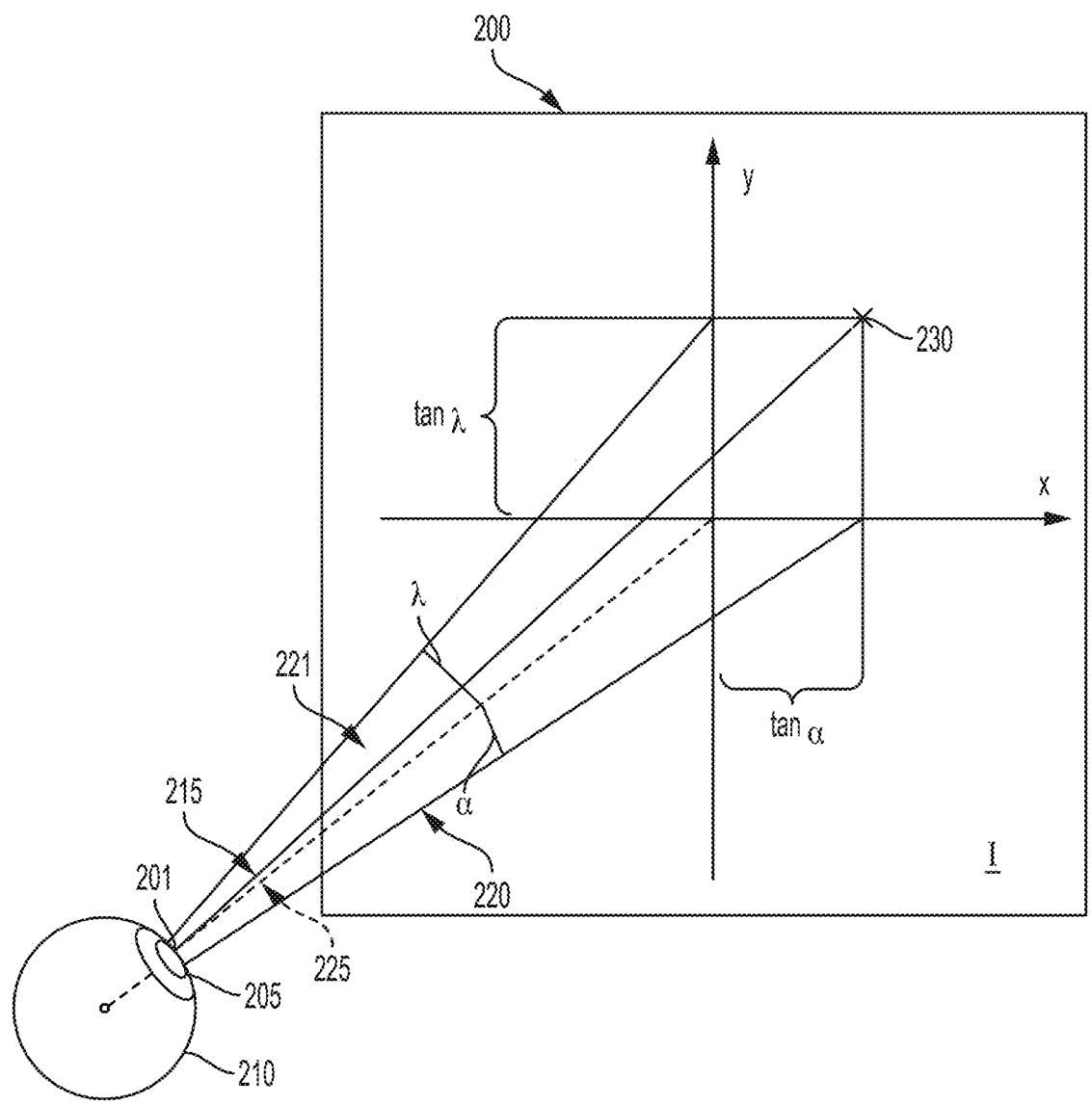
FIG. 2 illustrates an example of an image plane coordinate system.

FIG. 2 illustrates an example of an image plane coordinate system 200. In this example, a pinhole visual model is used to illustrate an image plane coordinate system. A pinhole visual model approximates visible light passing through a single point, such as, for example, a point 201 of the pupil 205 of the eye 210 of a viewer. Using the pinhole visual model, a ray of visible light 215 is parameterized by azimuth 220 and elevation 221 relative to the axis of view 225 as shown in FIG. 2. For example, if a pinhole-model is used to represent the view of an eye 210 having a FOV that is less than 180°, then the visual perception of the user can be uniquely characterized by a collection of point light sources lying on a plane I 200 that is perpendicular to the view axis 225. For example, as illustrated in FIG. 2, a point light source 230 at azimuth a and elevation A appears at coordinates $(x,y)=(\tan \alpha, \tan \lambda)$ on the I plane.

Figure 3:
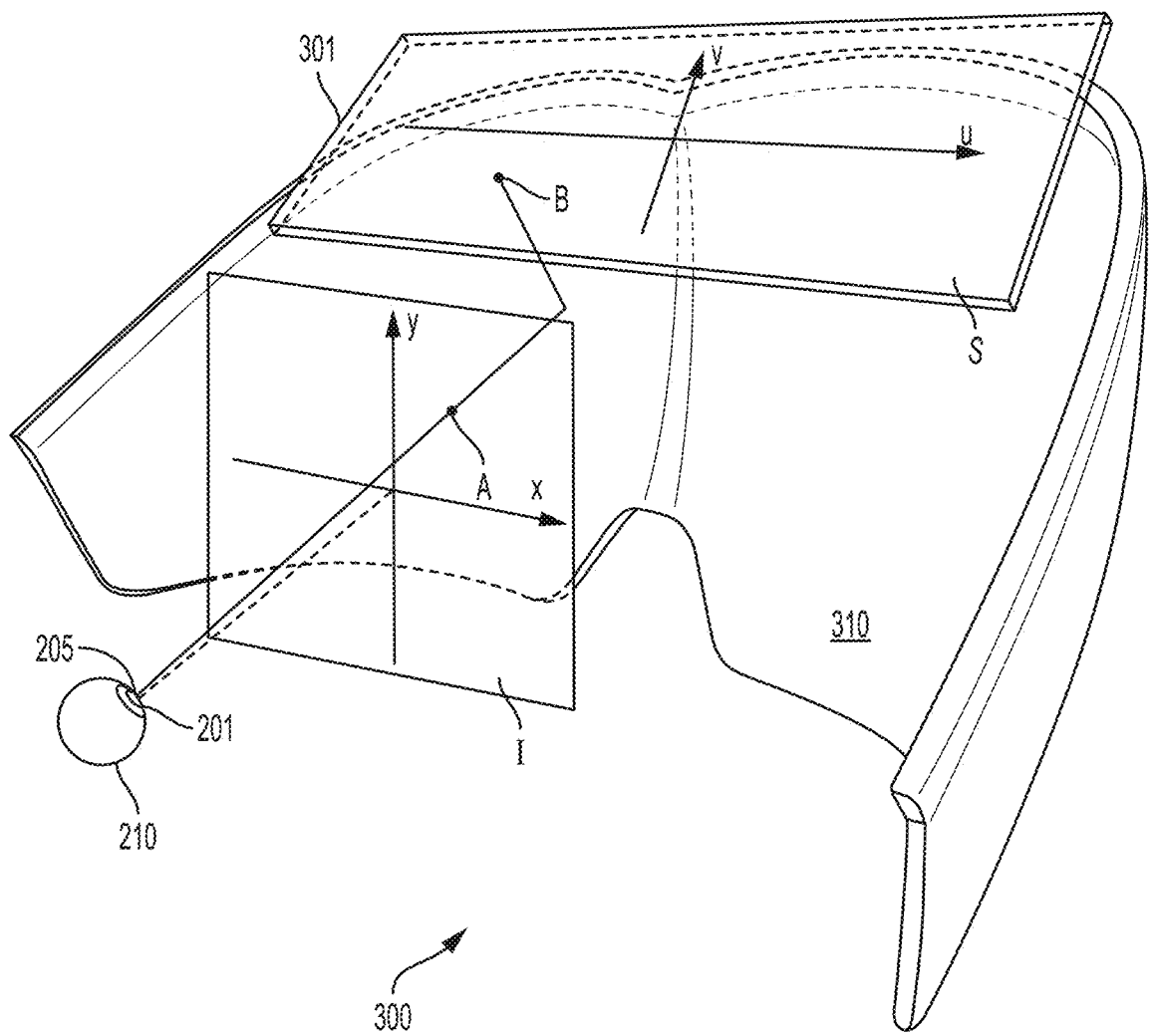
FIG. 3 illustrates an example of reflection mapping for an image plane coordinate system.

FIG. 3 illustrates an example of reflection mapping for an image plane coordinate system for a display system 300. As shown in FIG. 3, the display system includes an illumination or image source 301 and an optical element 310. Although not shown in FIG. 3 for conciseness and ease of explanation, it is appreciated that the display system 300 includes additional components, such as one or more processing devices (e.g., a central processing unit and/or a graphic processing unit) for controlling and generating the images shown by the image source 301, one or more memory devices, and additional components, such as a communication interface, and an input and an output device, among others, as described in greater detail below). As shown, a screen plane S corresponding to an illumination or image source 301 of the display system (e.g., a display screen of a display device or panel) is positioned relative to an optical element 310 (e.g., a visor with an eye image region that reflects light), such that light at point B on the plane S passes though point A on the plane I of the image plane coordinate system when viewed through a point 201 of the pupil 205 of the eye 210 of a viewer. The arrangement shown in FIG. 3 can be generalized for the optical element reflection as a mapping $\phi(A)=B$ between image points $A=(x,y) \in I$ and screen points $B=(u,v) \in S$.

Figure 4:
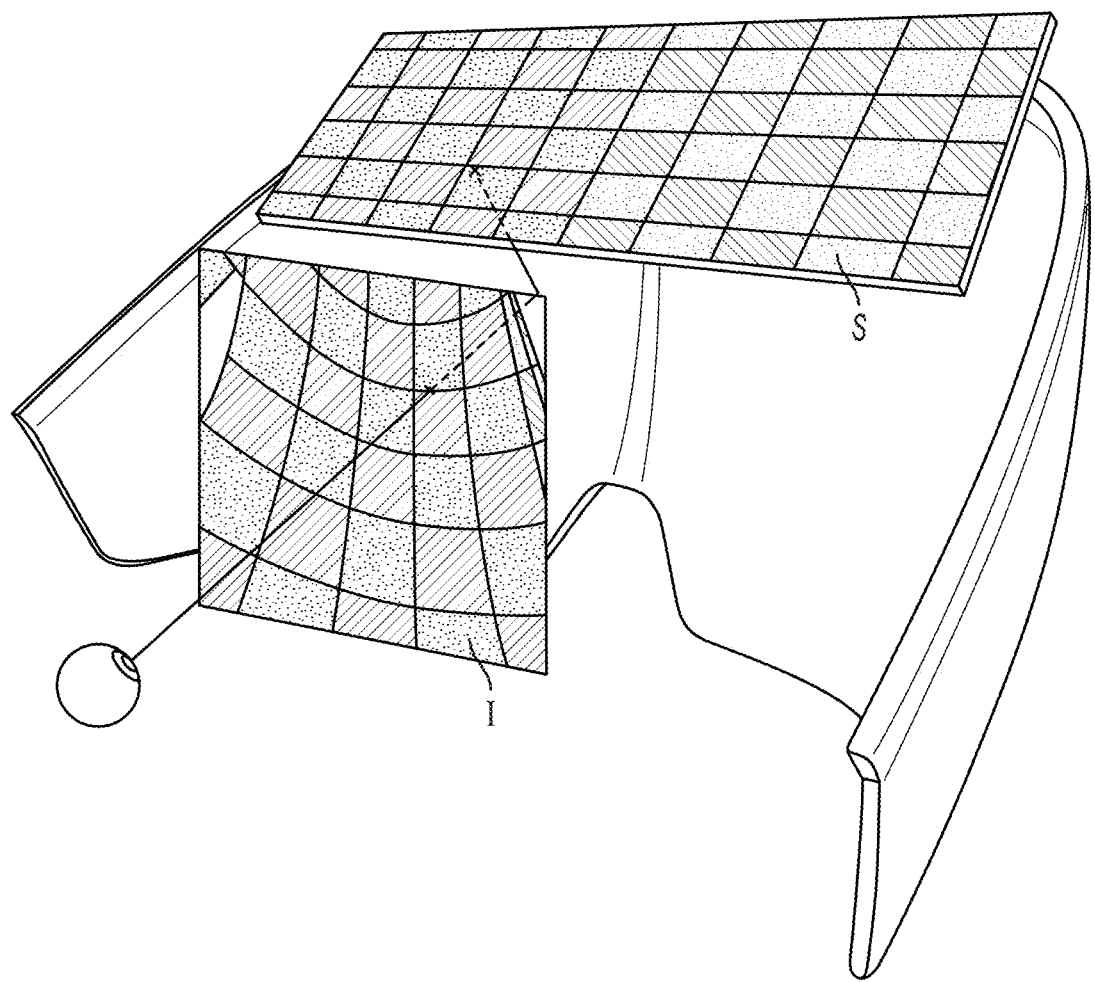
FIG. 4 illustrates an example of optics-induced distortion.

FIG. 4 illustrates an example of optics-induced distortion that may result from the reflection of a projected image by the optical component of the system shown in FIG. 3. As shown in the example illustrated in FIG. 4, an image is shown on the image source 301 corresponding to the plane S. In this example, the image displayed is a checkered pattern. The image is reflected by the optical component 310 of the display system 300. In this example, the optical component 310 has a contour and/or curvature (e.g., a prescription that focuses light reflected from the image source to the eye of the user). Because of the curvature of the optical component 310, when the image is reflected by the optical component 310, the image is perceived as distorted in the plane I of the image plane coordinate system when viewed through a point 201 of the pupil 205 of the eye 210 of a viewer. For example, the checkered image as shown in plane S of the image source 301 is shown as a checkered pattern having boxes with uniform dimensions arranged at right angles. However, the pattern perceived in plane I after reflection includes a checkered pattern with varying dimensions and angles. As seen, the distortion is not uniform and is more pronounced for certain areas of the image corresponding to the curvature of the optical element at the point of reflection for that area.

Computing the Forward Distortion Map

A forward distortion map is generated to model the warping effect of the corresponding optical element of the display system. For example, the warping effect induced by the optical element for a display image as seen by the user may be expressed by equation 1:

$$(u,v)=\phi(x,y) \qquad \text{Equation 1}$$

where u and v are the pixel coordinates of a point visible on the image source of the display system at homogeneous image coordinates (x,y) in the image plane.

To create the forward distortion map, a digital mesh or lattice representing the shape and/or contour of the reflective surface of the optical element of the display system is created. In one example, a mesh or lattice is a set of vertices and faces. Vertices are sets of 3D coordinates, and faces are ordered lists of three or more distinct (usually) coplanar vertices, (usually) listed in counterclockwise order around an oriented normal vector. For example, in a mesh an edge is an ordered pair of "neighboring" vertices, i.e., vertices listed consecutively in one or more faces. Generally, one edge should belong to exactly two faces, which list the two vertices in opposite order. Such a mesh is called "closed" or "watertight". In some example, a lattice is a mesh whose vertices correspond to points on a regular grid (e.g., formally, to points (a_1, . . . , a_d) in R^d, where a_i are all integers), and whose set of faces is closed under translation. In one example, the resolution of the mesh grid may be defined as the maximum distance between any two neighboring vertices.

Figure 5:
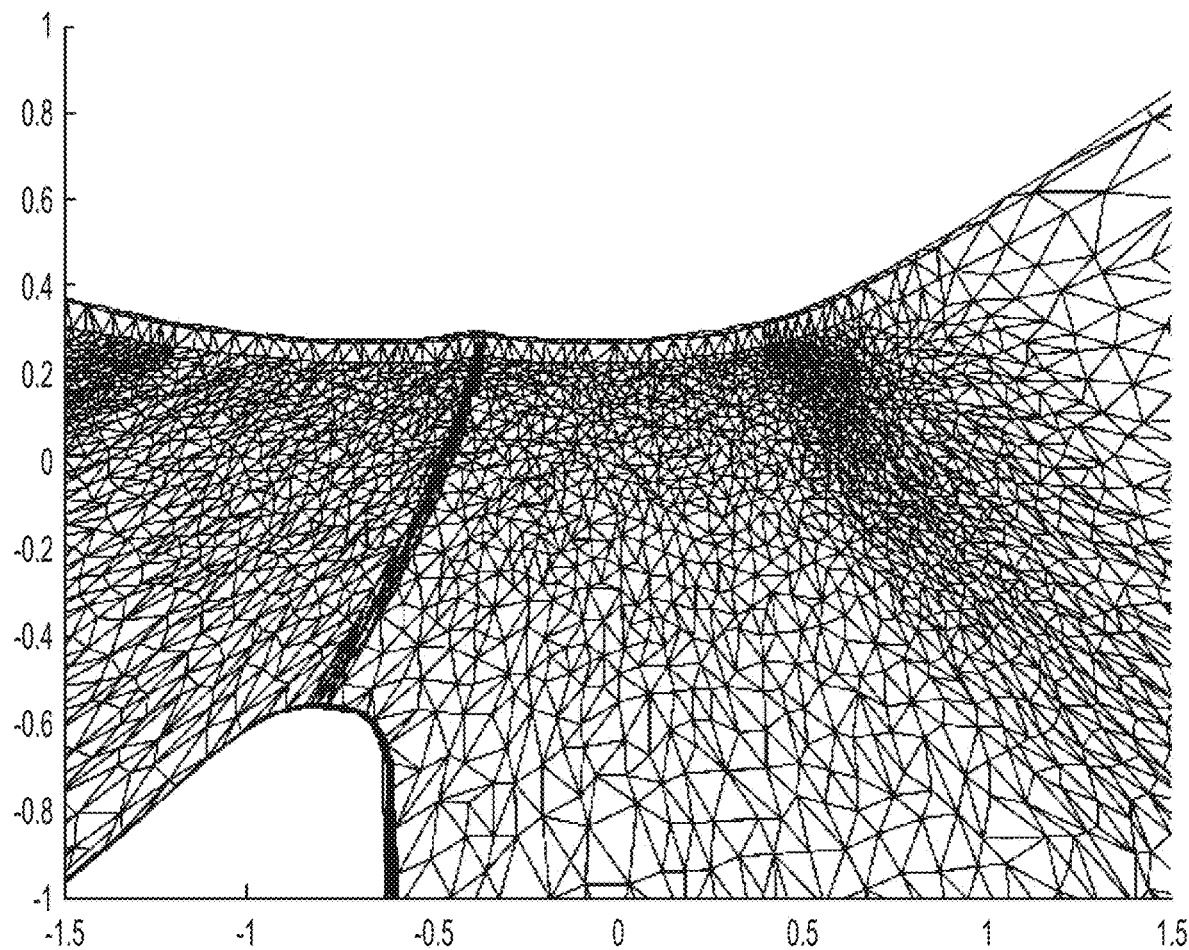
FIG. 5 illustrates an example of mesh in eye coordinates.
Figure 6:
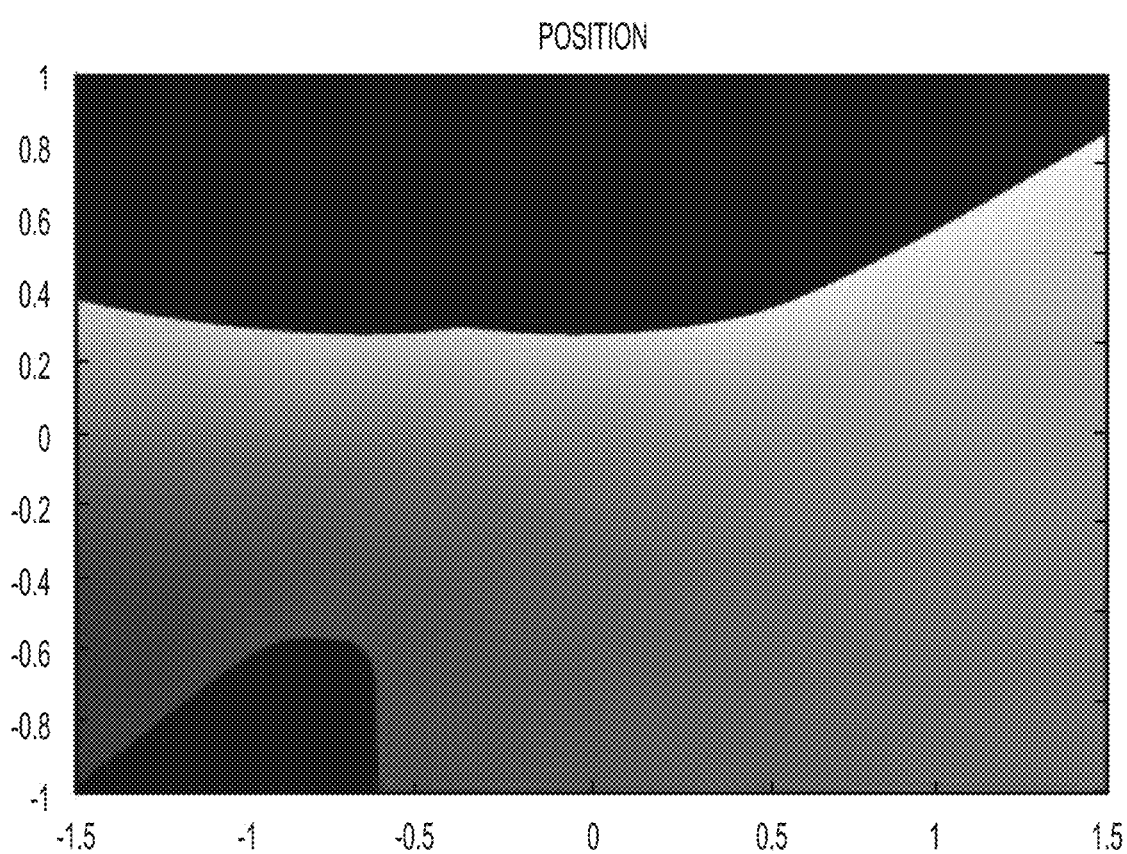
FIG. 6 illustrates an example of a three-dimensional (3D) position map.
Figure 7:
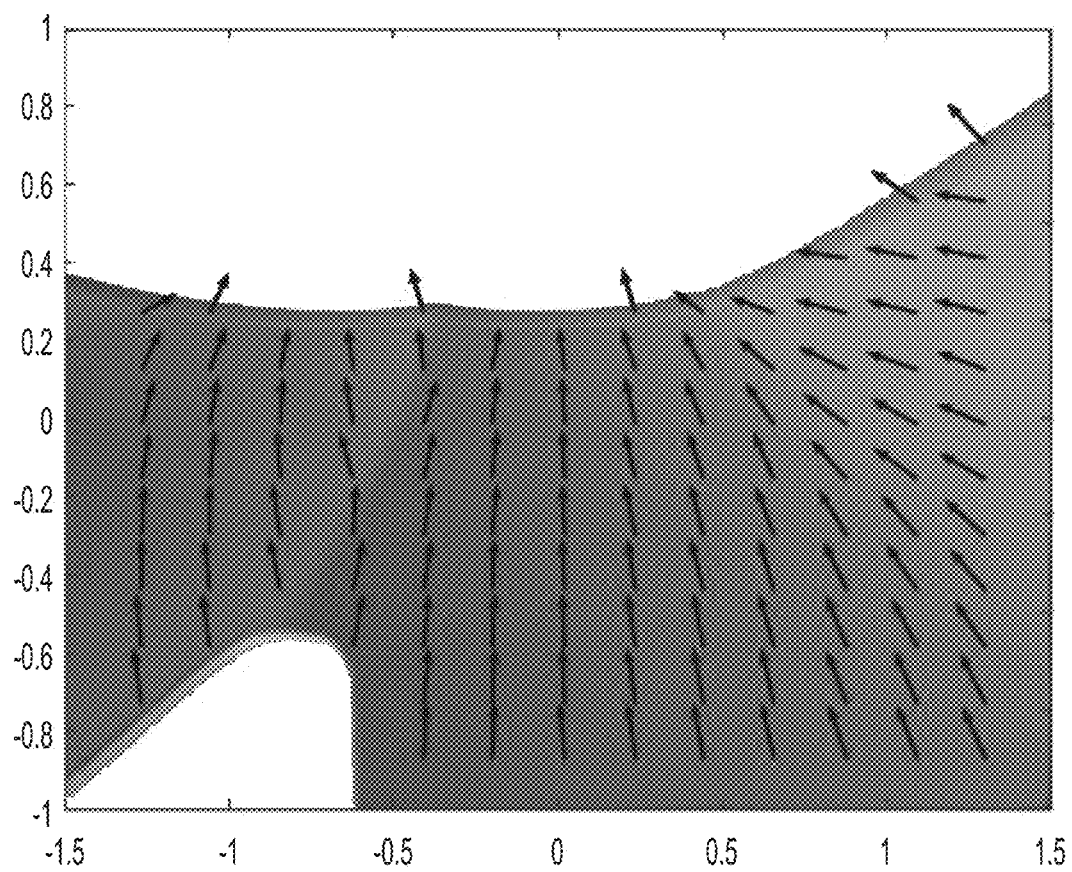
FIG. 7 illustrates an example of a normal map.

FIG. 5 illustrates an example of a portion of a mesh that is created for the reflective surface of the optical element. The mesh may be created in perspective according to the pinhole visual model described in the last section, and the mesh is rendered in image plane coordinates. In one example, the mesh may be create using a computer aided design (CAD) application. For example, a CAD used to design the optical element or a CAD loaded with the specifications used to manufacture the optical element may be used to map a mesh to the interior surface of the optical element using a meshing function of the CAD. For example, CAD models are generally described as a set of watertight splines, which are converted to a mesh by subdivision. A set of points is selected on the surface of the model. The selection and/or number of points may be made based on a trade-off between complexity (e.g., for want fewer vertices), size (e.g., for want smaller total surface area), and fidelity (e.g., for want to preserve topology and minimize the average (or maximum, or some mixture) distance between a point on the true surface and the nearest point on the mesh. For example, simpler methods consider only the nearest vertex whereas better methods consider points on the interior of faces. The mesh is used to create a three-channel position map and a normalized three-channel normal map. FIG. 6 illustrates an example of a three channel position map (e.g., corresponding to red, green, and blue channels) for the same optical surface as the mesh of FIG. 5. FIG. 7 illustrates an example of a normalized three channel map for the same optical surface as the mesh of FIG. 5.

For example, for each vertex in the mesh, a position (e.g., a 3D set of coordinates taken from a CAD mode) and corresponding normal vector is determined. The normal (e.g., "vertex-normal") is an additional 3-D vector that is associated to each vertex. The normal is a normalized, weighted average of the oriented face-normal vectors ("face-normal") of the faces surrounding that vertex. The face-normal of a given face is the unique vector perpendicular to the plane containing the vertices of that face, and about which the vertices can be arranged in counterclockwise order, with the normal facing out. Formally, it is the normalized cross-product of the vectors v1-v3 and v2-v3, where v1,v2,v3 are the first three unique vectors listed in that face. For each image plane pixel at the position or normal map, the position or normal of the three vertices nearest to the position on the corresponding image plane is interpolated. For example, the position and normal maps are densified 2D perspective projections of 3D meshes. A perspective projection is a mapping from 3D space (e.g., the space in which the vertices live) to homogeneous 2D space (i.e., the image plane). The image plane may be discretized as an array of pixels for a regular 2D lattice of point-samples. In one example, barycentric interpolation may be used although other interpolation methods that consider more neighbors also may be used.

Figure 8:
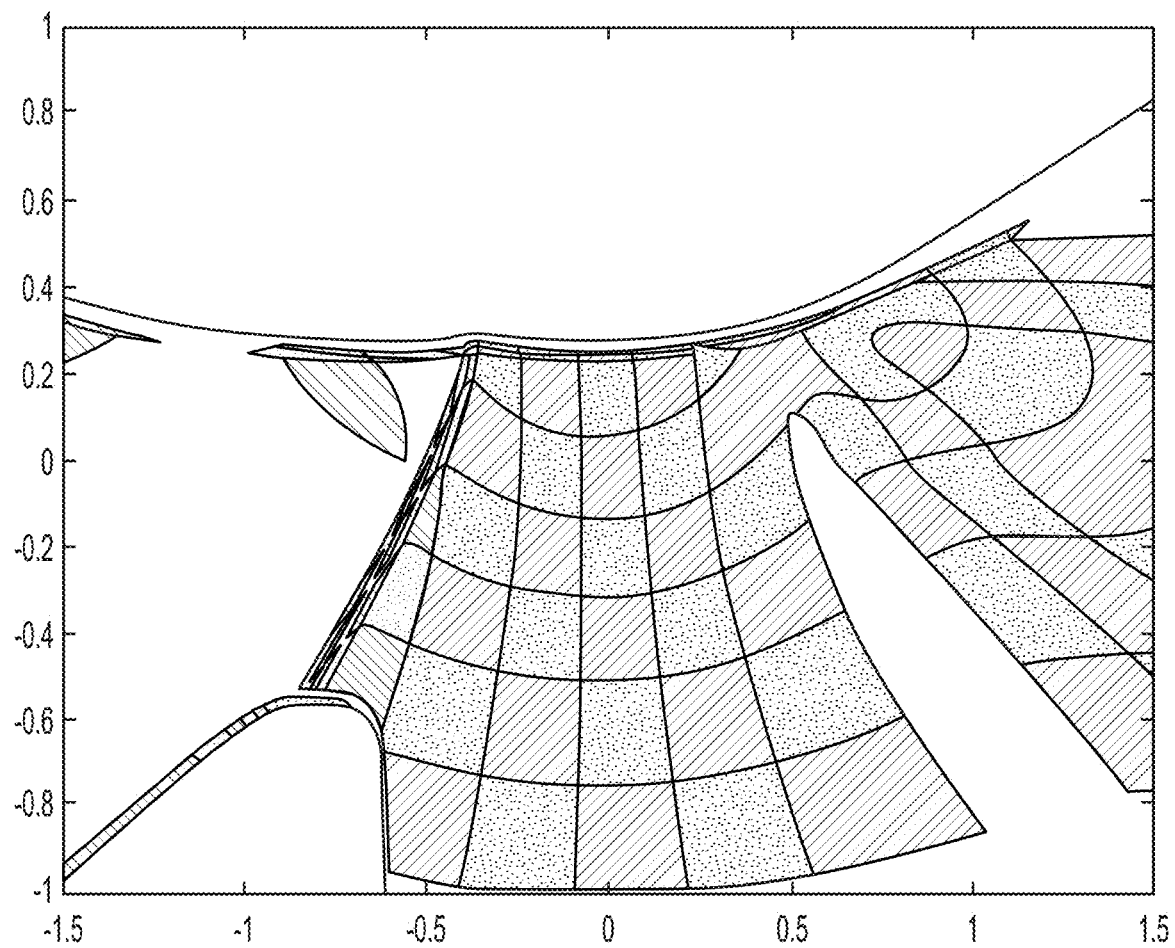
FIG. 8 illustrates an example of a warped view.

In one embodiment, a distortion map is computed as a composition of the vector-valued positions expressed as a composition of vector-valued position $\vec{p}(x,y)$ and normal images $\vec{n}(x,y)$ derived from FIGS. 5-7 for the warped view of the optical element, as illustrated in FIG. 8.

The normal image is a pixel array with three numbers associated to each pixel where the red, green, and blue channels of a digital image (e.g., png) are determined by these three numbers. For example, the normal image is a 3-channel (e.g., one channel corresponding to each of x,y,z), pixel array. Each pixel representing a square region of the image plane has three numbers attached to the pixel, which together describe a unit 3D vector. The 3D vector is an approximation of the vector normal to the point on the mesh surface that "seen" by this pixel (i.e., by light rays travelling through this point on the image plane).

For example, a reflected ray from the optical element, incident at the position vector $\vec{p}$, is determined according to Equation 2:

$$\vec{v}_{out} = (I_3 - 2\vec{n}\vec{n}^T)\vec{v}_{in},$$ Equation 2: Reflection where $I_3$ is the 3×3 identity matrix, T denotes the transpose of $\vec{n}$, and $\vec{v}_{in} := p - p_{eye}$ (i.e., the vector between the eye (e.g., the pupil or point seeing the light) and point p). In this example, the 3D-vector-valued matrices are displayed in XYZ-to-RGB format, in which the red, green, and blue channels of the image are defined by normalized x-, y-, and z-components of the vector field.

Once the warping induced by the optical element is determined, a forward distortion map is generated. In one example, a branch of φ(x,y) is restricted to a regular lattice L={($x_i,y_i$)}⊆I and warped under φ to produce a warped lattice φ(L)={φ($x_i,y_i$)}⊆S. The warped lattice is a regular 2D lattice whose points lie at constant vertical and horizontal distance from one another and represents a forward distortion map corresponding to the distortion introduced by light reflecting from the optical element to the eyes of a viewer of the optical display system. In this example, a branch of φ is a subset of the domain of φ over which φ is invertible, i.e., for which no two points (x1,y1) and (x2,y2) map to the same point (u,v). On this subset, a unique inverse is defined.

Figure 9A:
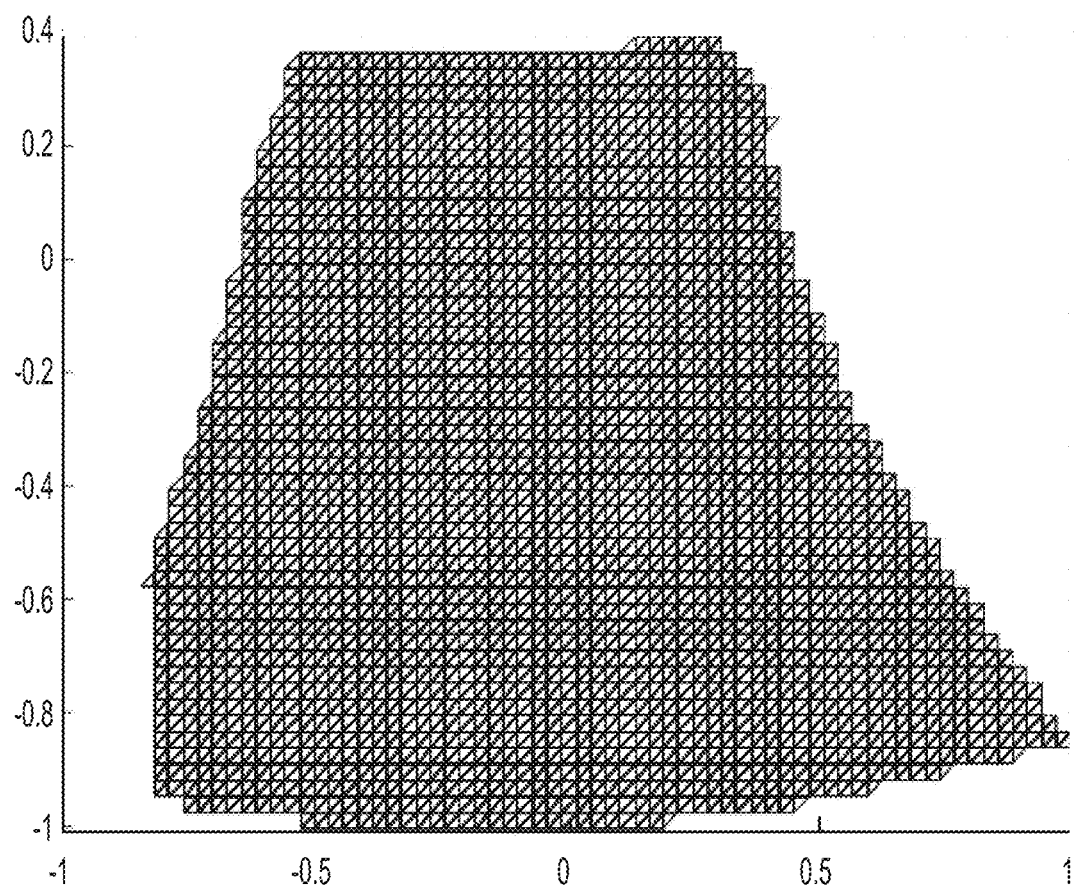
FIG. 9A illustrates an example of a sparse forward distortion map.

FIG. 9A illustrates one example of a sparse forward distortion map for the rays computed by equation 2. As shown in FIG. 9A, the map includes a lattice with regular spacing and connections. In this example, a mesh or lattice of a regular grid of triangles is used to form the sparse map. Because the forward distortion map is only defined on these grid points, the map is described as sparse. In one embodiment, the sparse forward distortion map or portions of the sparse forward distortion map also may be generated using the system shown in FIG. 9B during a fine-tuning or calibration process.

Computing the Inverse Distortion Map

Once a forward distortion map is created, the inverse distortion map is determined for the corresponding forward distortion map. In one embodiment, the inverse distortion map is created having a mesh of arbitrary density. In one example, subsampling of a mesh may be used to reduce the computational load of the inversion process on any particular processing device implementing the inversion of the display image, but subsampling is not required by the process. In another example, greater fidelity for an output image can be achieved by upsampling or constructing a mesh of greater resolution than an original sparse inverse distortion map. For example, a sparse inverse distortion map may be determined and then filled to create a dense or high-resolution inverse distortion map.

Figure 10:
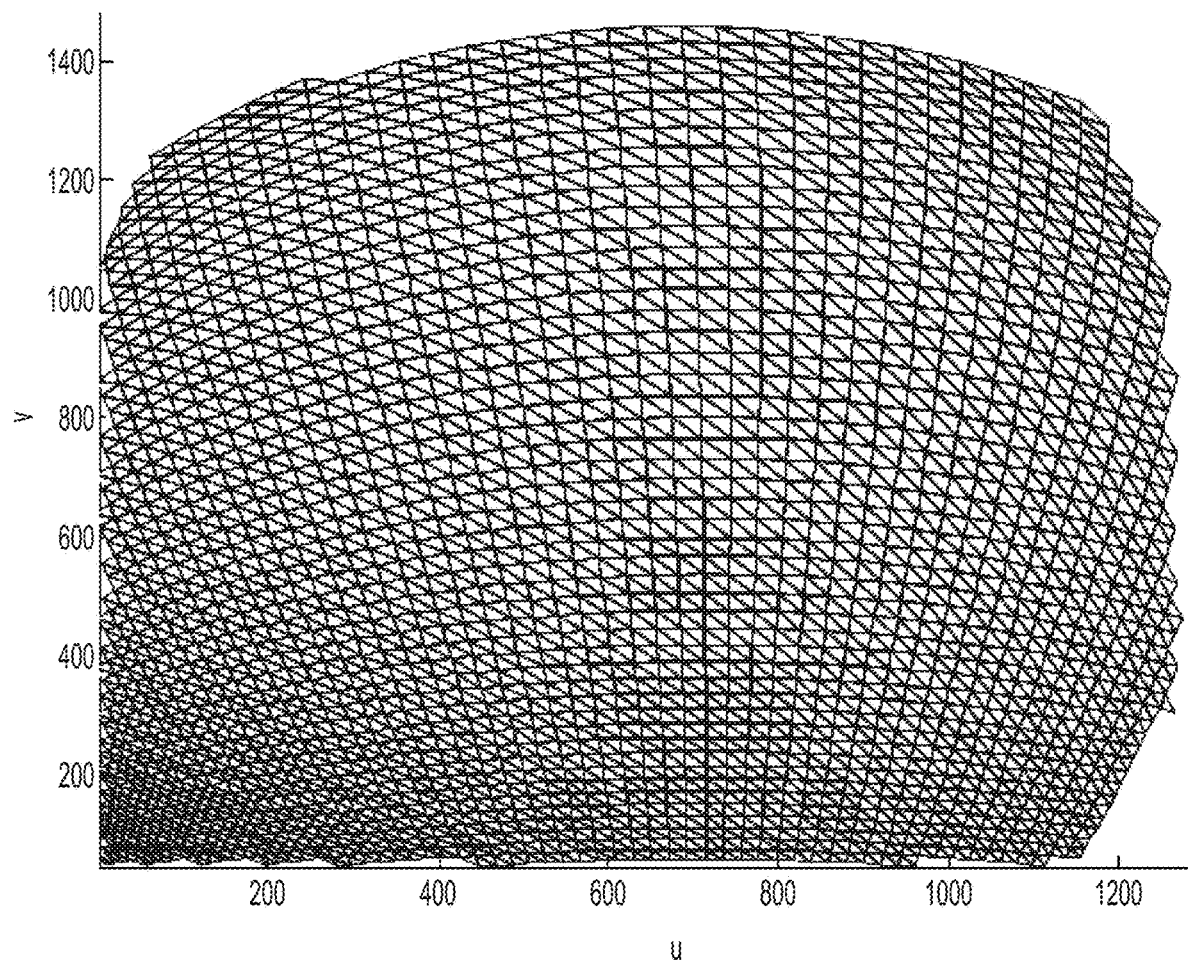
FIG. 10 illustrates an example of a sparse inverse map.

In one example, a sparse pre-warping or inverse distortion map may be computed using Equation 3:

$$\psi_L : \phi(L) \to I; \ \psi_L : \phi(x_i, y_i) \mapsto (x_i, y_i).$$ Equation 3:

Equation 3 specifies a function that maps points distorted by the warped lattice $\phi(L)$ back to their original locations in the display plane. FIG. 10 illustrates an example of a sparse inverse distortion map expressed in screen pixel coordinates generated from Equation 3. The inverse distortion map shown in FIG. 10 is referred to as sparse because only those points whose original locations were on the regular lattice L are mapped. The sparse map provides a scattered set of landmarks, for example, the grid points shown in FIG. 10, from which a dense map may be generated. The grid points lie at positions $\phi(x_i, y_i)$. They are the points of the sparse grid or lattice (whose ith point lies at $\phi(x_i, y_i)$), but distorted by the forward distortion map $\phi$ (restricted to the sparse lattice).

Figure 11A:
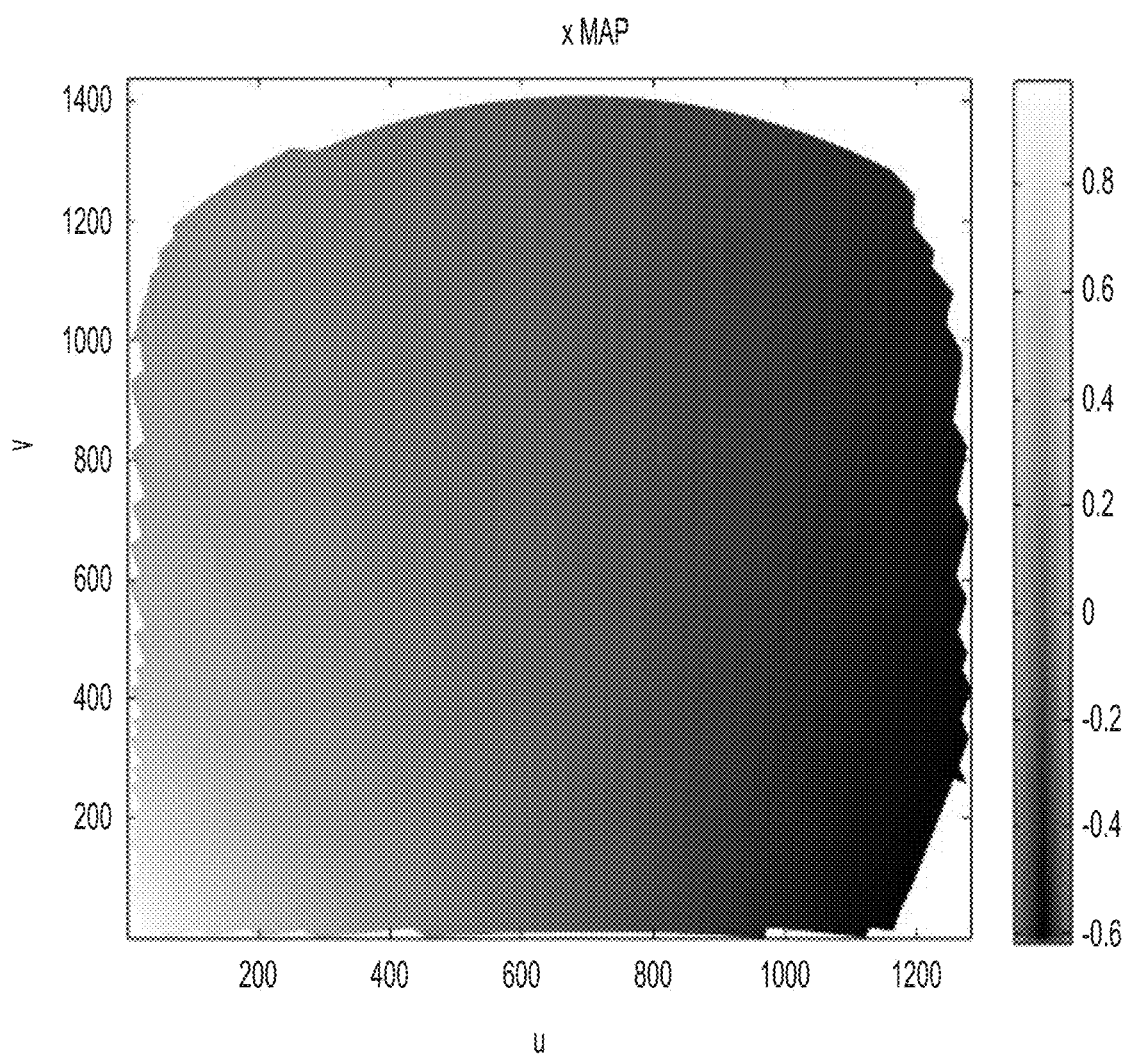
FIG. 11A illustrates an example of a dense inverse map in the x-dimension.
Figure 11B:
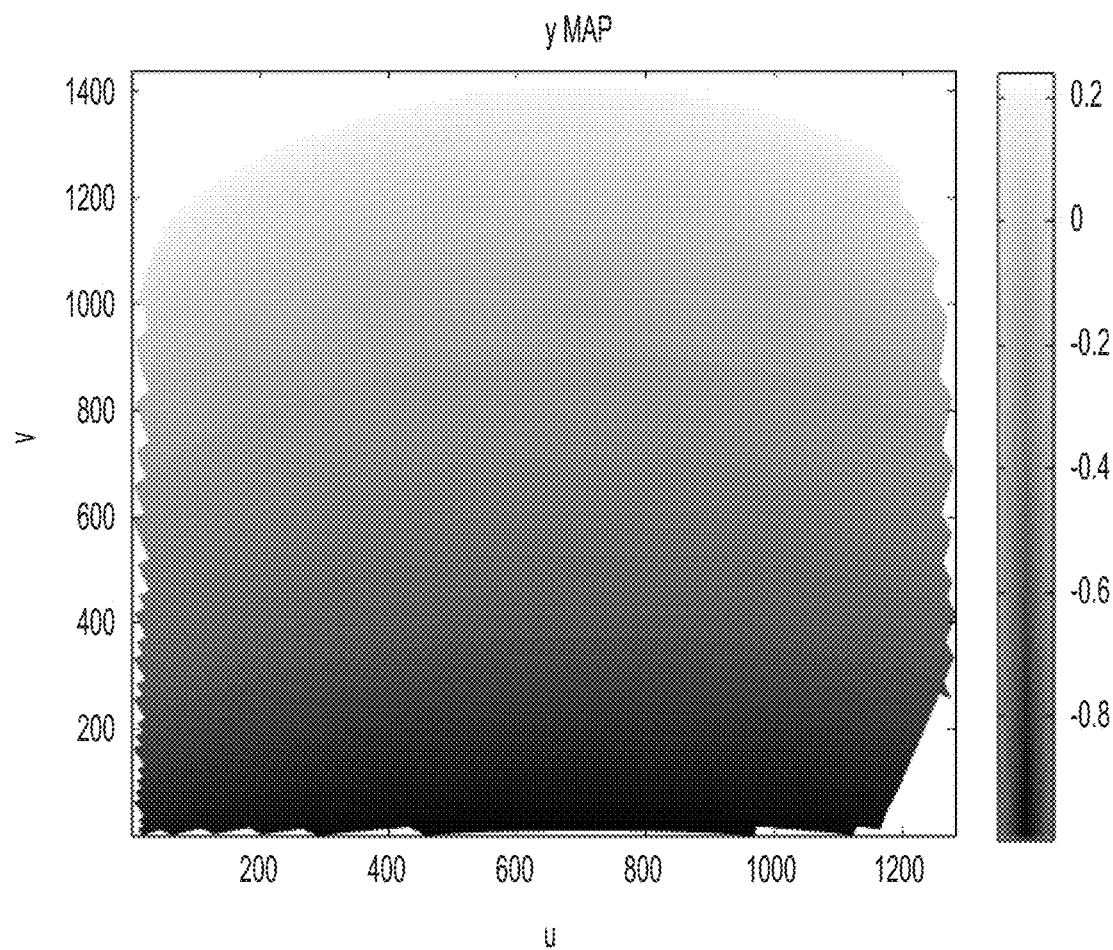
FIG. 11B illustrates an example of a dense inverse map in the y-dimension.

In one example, the sparse inverse distortion map may be filled in to create a dense inverse distortion map shown in FIGS. 11A and 11B. For example, FIG. 11A illustrates an example of a dense inverse distortion map in the x-dimension; and FIG. 11B illustrates an example of a dense inverse distortion map in the y-dimension. The two maps for the x and y dimensions have the same domain (i.e., the headset display), and so the maps can be combined into a two-channel image (e.g. red and green, or red and blue), however, the separated here to show contours of the example provided.

To create a dense map, the sparse inverse function $\psi_L$ defined for the warped lattice points (i.e., the grid points) are interpolated according to their neighboring sparse lattice points to fill in the area between the warped lattice points and increase the resolution of the inverse distortion map. In one example, barycentric interpolation may be used. For example, referring to the warped lattice in FIG. 10: the lattice points "neighboring" a pixel (u,v) are those at the corners of the triangle $\{(u_i, v_i), i=\{1, 2, 3\}\}$ surrounding (u,v). A weighted average of their attributes (the coordinates $(x_i, y_i) = \psi_L(u_i, v_i)$) is assigned to (u,v). As lattice density increases, the densified map $(\psi_L)_{dense}$: S→I approaches a right-inverse of $\phi$.

Calibration and Fine Tuning

Figure 9B:
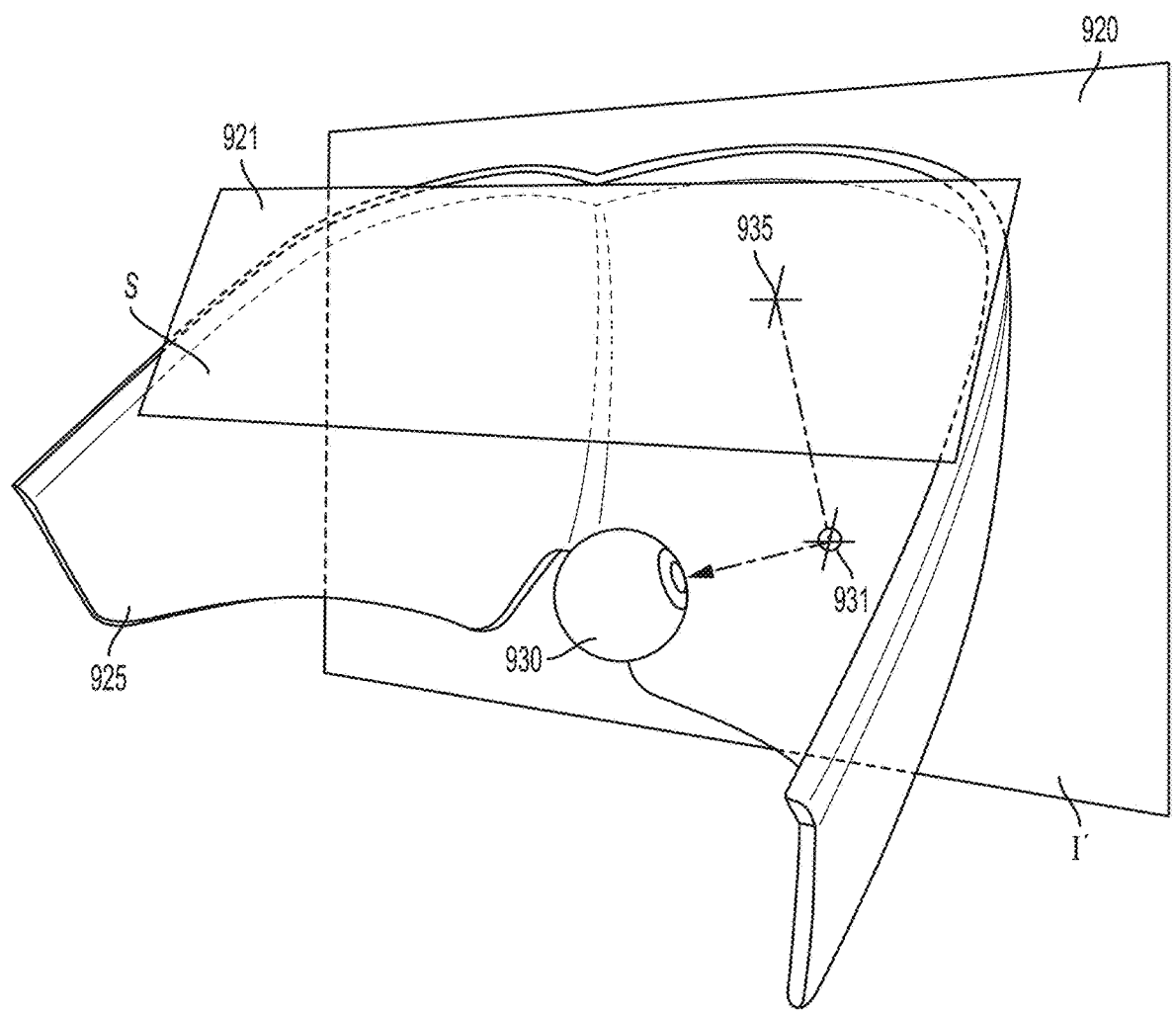
FIG. 9B illustrates an example of a system for generating a forward sparse map or a portion of a sparse forward distortion map.

As shown in FIG. 9B, an auxiliary display screen 920 is used to help create a forward distortion map for a display system including an illumination source, for example, a display device 921, and an optical element 925 (e.g., a visor including image areas). The display screen 920 is positioned relative to the display system so that an eye 930 of the user of the display system looking through the optical element 925 views the auxiliary display screen 920. When positioning the arrangement shown in FIG. 9B, the optical element 925 is aligned precisely with a fixed position relative to the external screen 920.

After the inverse distortion map is created, it may be further fined tuned. For example, using the arrangement shown in FIG. 9B, the optical element 925 is fixed to a rigid mount (not shown), and an image is shown on an auxiliary screen 920. A user viewers the auxiliary display device 920 to assist collection of point pairs (e.g., x,y) that map an image in the plane I' of the screen of the auxiliary display device 920 to the image displayed in plane S of the screen of the display device 920. In this process, a virtual scene containing a virtual screen, congruent to the real scene and displaying the same image, is rendered with the existing inverse distortion map. The user manipulates an input device (not shown), such as a mouse, a joystick, or other directional input device, connected to the display system which controls the position of the displayed cursor. The user manipulates the input device to align the cursor viewed by the user via reflection by the optical element 925 with a point in visor screen space (e.g., a pixel, if you like) 931 on the auxiliary screen at which the correspondence between the real and virtual images is unsatisfactory. The user drags this portion of the virtual image until it overlaps better with the real image. Once aligned, the user signals an indication of the alignment with the input device. This process is repeated for various points on the optical element 925 for which the user is not satisfied. Every time the user indicates alignment, the program makes a record of the position of the cursor and the corresponding point being displayed on the external display screen 920. The program determines a region of the sparse inverse mesh (a few of the vertices near the cursor) that was selected by the user and drags them toward another point on the headset display. To ensure that this operation induces a smooth distortion of the display, an attenuating weighting function is applied by the program so that vertices furthest from the selection point 931 move less (e.g., similar to the standard "nudge" tool in many photo-manipulation programs). The new sparse inverse distortion map is densified again, and a new, smooth, calibrated inverse distortion map is created. The click-and-drag operation may be repeated again until a user is satisfied with the resulting display.

The process described in this example also may be useful in fine-tuning/calibrating the sparse map for particular users (i.e., controlling for the individual biology of a user); fine-tuning/calibrating the inverse distortion map generated, as described below, to increase density of the sparse map in specific target regions (e.g., where the mesh created by the CAD application is lacking in points or does not accurately capture the shape of the optical element); and to accommodate/fine-tune/calibrate the forward distortion map for mass manufactured optical elements, for example, which may include slight imperfections not found in the mesh of the ideal optical element for which the forward distortion map was originally generated.

Process Flow for Computing and Applying Distortion Maps

Figure 12A:
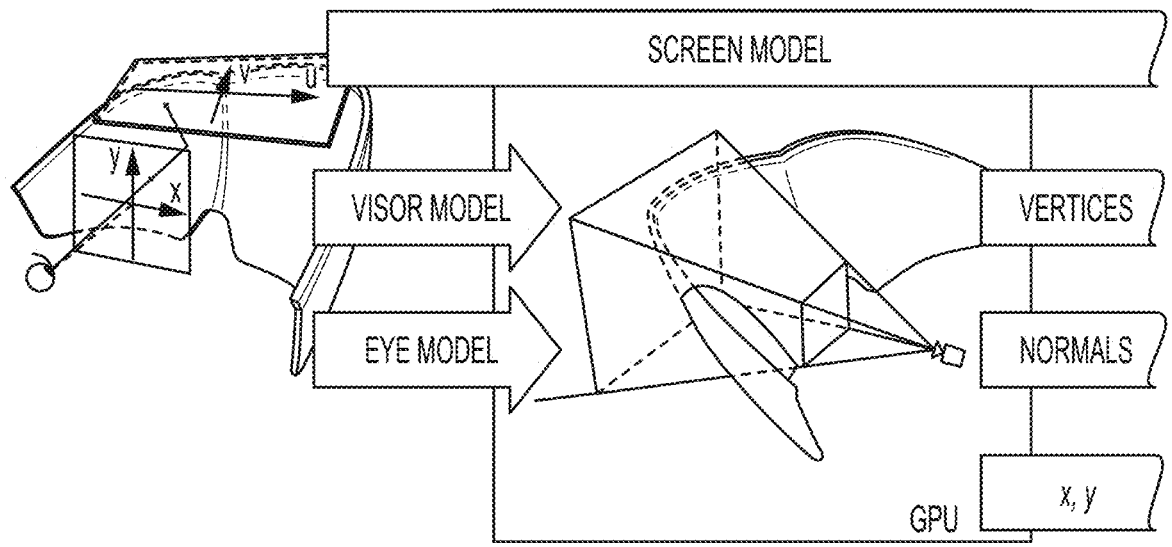
FIGS. 12A, 12B, 12C, and 12D show a block flow diagram illustrating computation of distortion maps.
Figure 12B:
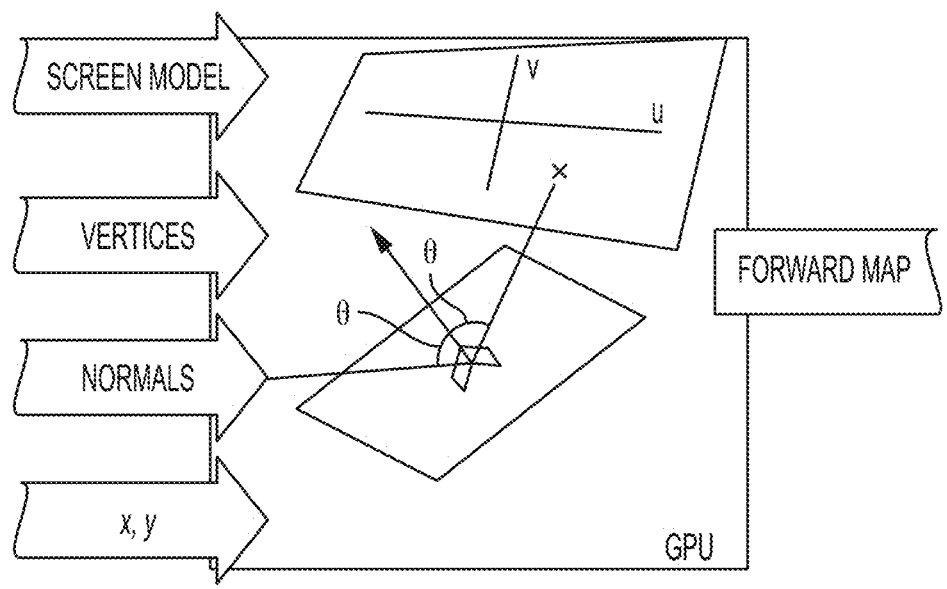
Figure 12C:
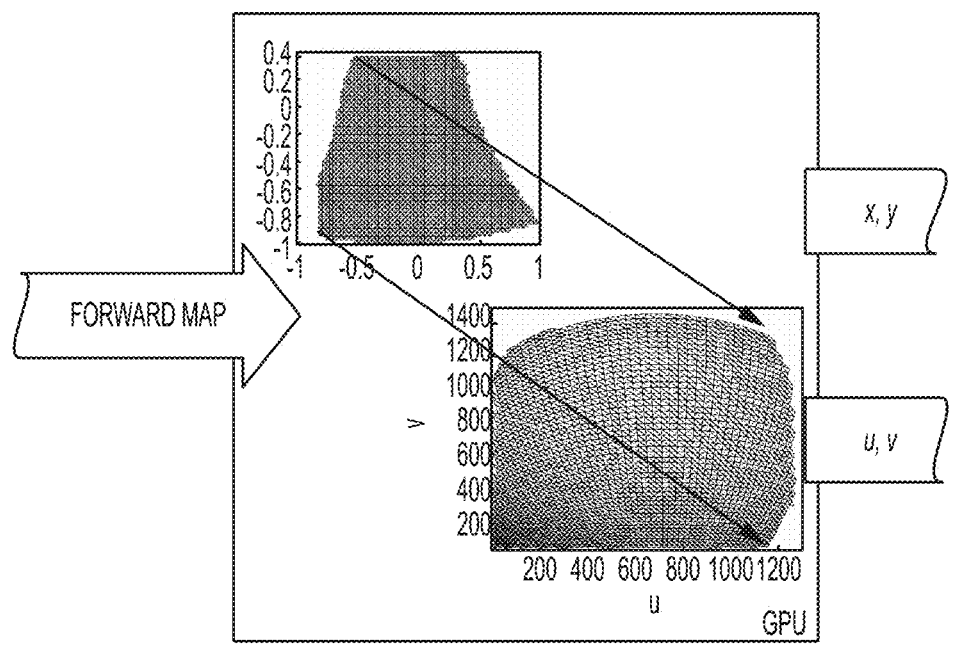
Figure 12D:
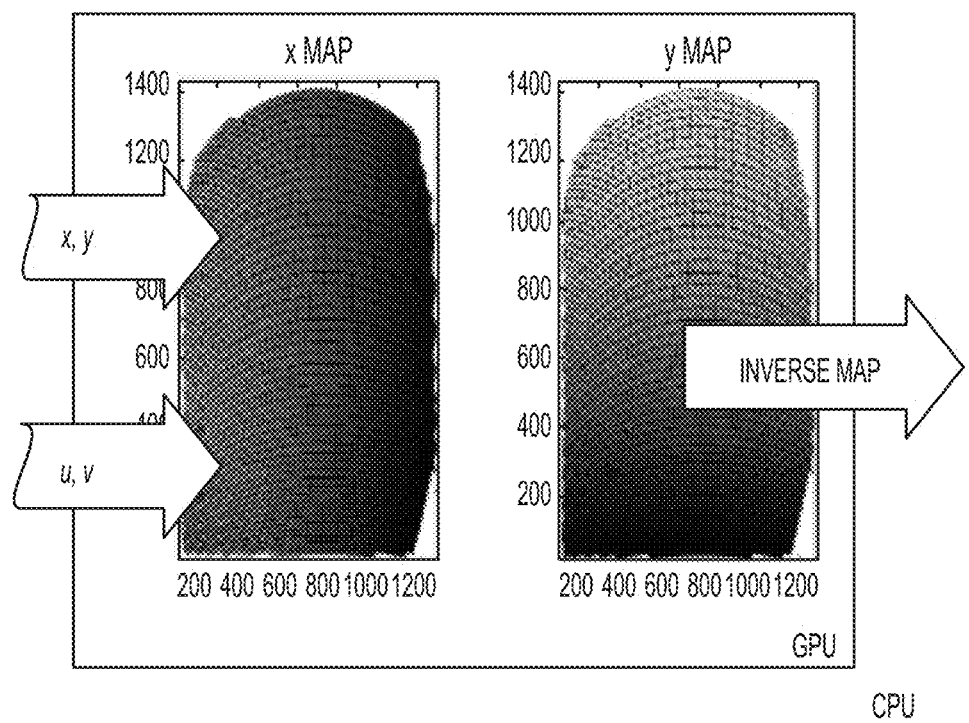
Figure 12E:
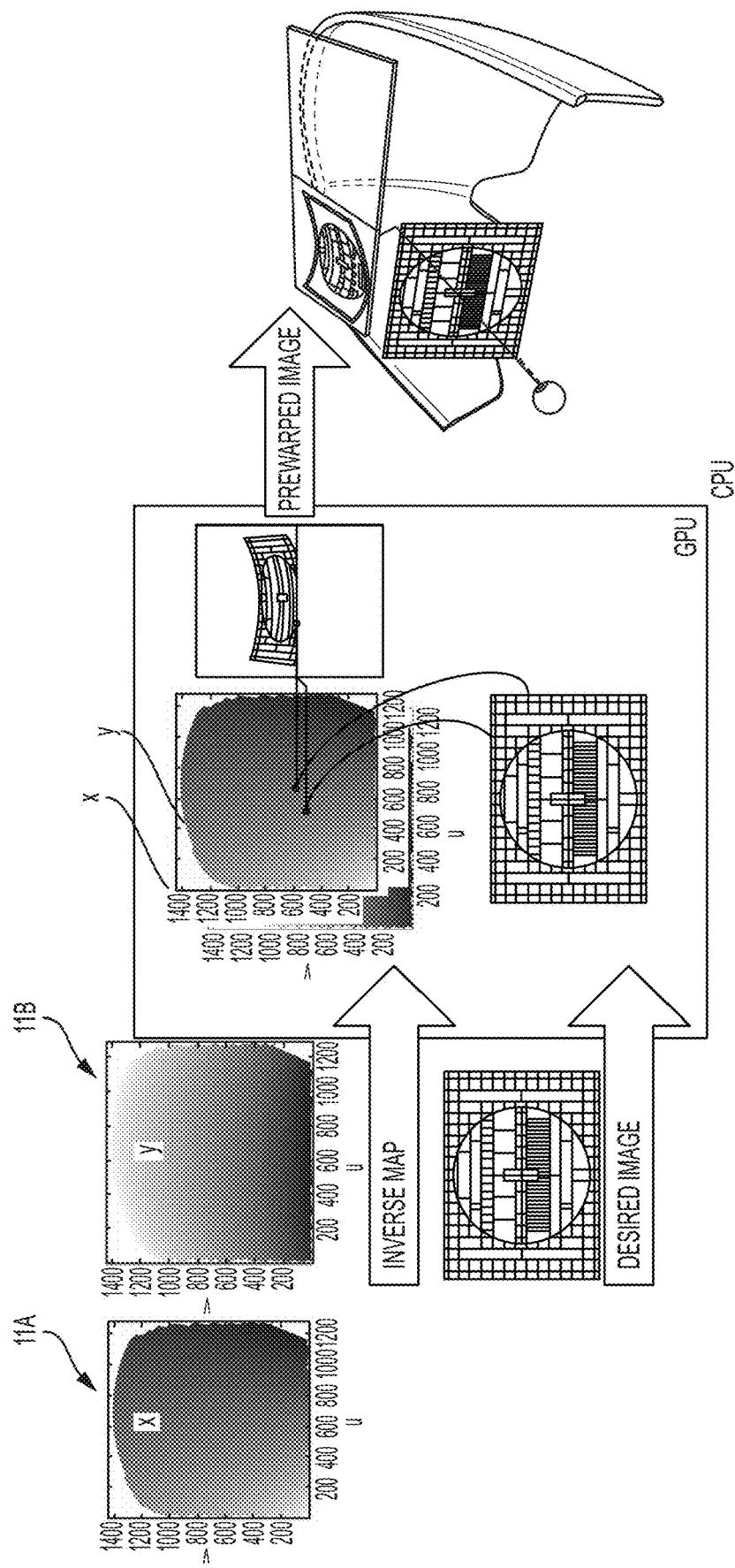
FIG. 12E shows a block flow diagram illustrating applying of distortion maps.

FIGS. 12A, 12B, 12C, 12D, and 12E show an example of the entire unwarping pipeline, from the physical optical model to operation in a display system. For example, FIGS. 12A-12D show a block flow diagram illustrating computation of distortion maps for a display system, and FIG. 12E shows a block flow diagram illustrating the application of the distortion maps in the display system. In the following example, operations of FIGS. 12A-12D compute a static unwarping or inverse distortion map created for an optical element of a display system and a corresponding eye position. In one embodiment, the process of operations FIGS. 12A-12D is performed once per wearer or following an adjustment of the fit of the visor system for the wearer. For example, by performing the calibration of the operations FIGS. 12A-12D for each wearer the of the vision system, it is possible to precisely map the inverse distortion or pre-warping to that user's specific eye positions. In another example, mapping may be determined for an average user eye position. In this example, the user may mechanically adjust the position of the system to best match their eye position to a map determined for a predetermined eye position; however, the image view in such a case may not be as optimized or distortion free as one obtained with individual mapping. Having determined an inverse distortion map for the a user in operations FIGS. 12A-12D, the inverse distortion map is stored in a memory (e.g., a file within a storage device associated with the display system). In FIG. 12E, the inverse distortion map is accessed from the memory and applied to an image during rendering the of the image on the display screen of the display device of the display system.

All operations implemented by FIGS. 12A-12E are manifestly suited for parallel execution on a processing device, such as, for example, a standard Graphics Processor Unit (GPU). For example, the GPU may implement a rendering pipeline to provide images to a frame buffer of the image source or display of the optical system. The GPU may employ a number of program, such as shaders, that describe the traits of either a vertex or a pixel. For example, a vertex shader may describe the traits (e.g., position, texture coordinates, colors, etc.) of a vertex, while pixel shaders may describe the traits (e.g., color, z-depth and alpha value) of a pixel. The vertex shader is called for each vertex in a primitive; therefore, for each vertex in, an updated vertex is output. Each vertex is then rendered as a series of pixels onto a surface (block of memory, such as a frame buffer) that is read by the image source. One example of a graphics processor is the NVidia GeForce 10 series.

In one example, a basic rendering pipeline for a graphic processor may include, a processing device, such as a central processing unit (CPU) providing instructions (e.g., compiled shading language programs) and geometry data to the graphics processing unit. In one example, a GPU, located on the graphics card. A vertex shader of the GPU first transforms the geometry of a given 3D scene. If a geometry shader is in the graphic processing unit and active, some changes of the geometries in the scene are performed. If a tessellation shader is in the graphic processing unit and active, the geometries in the scene can be subdivided. The calculated geometry is triangulated (e.g., subdivided into triangles). The triangles are broken down into fragments, such as fragment quads (e.g., one fragment quad is a 2×2 fragment primitive). The fragments are modified according to a fragment shader. A depth test is performed, and fragments that pass are written to the image source. In one example, the fragment are blended into the frame buffer. The rendering pipeline uses these operations in order to transform three-dimensional (or two-dimensional) data into useful two-dimensional data for displaying by the image source. In general, this is a large pixel matrix or "frame buffer." The shaders are written to apply transformations to a large set of elements at a time, for example, to each pixel in an area of the screen, or for every vertex of a model. As such, the rendering pipeline may be implemented using parallel processing, and the GPU, for example, may compute multiple shader pipelines to facilitate faster computation throughput.

According to the examples given herein, to compute the path of light from screen to eye, a deviation from the basic rendering pipeline described above-is made by passing a nonstandard set of the reflector's vertex attributes, including position and normal vector, down from the vertex shader to the fragment shader. As a result, the fragment shader has information at each pixel to compute the trajectory of the ray of light between the reflector and the screen, from which the two-channel XY distortion texture is computed.

The image is then passed as a uniform variable to a second vertex shader, which samples from this texture at the vertices of an input mesh (a predefined 254×254 plane mesh). The vertex shader transforms the geometry as follows: XY samples are swapped with the mesh UV coordinates. This transformed mesh is passed to a second fragment shader, which paints its mesh UV attributes (e.g., samples from the XY distortion texture) at and around the XY positions (actually UV coordinates of the original mesh) of the transformed mesh. This produces the texture describing the dense inverse distortion map.

A raw image texture (rendered by the basic pipeline onto a standard virtual camera in a virtual scene) is passed through a final fragment shader, which takes fragment local coordinates (UV coordinates of a full screen quad) and uses them as arguments to sample from the dense inverse distortion map texture. This returns XY coordinates which are in turn used to sample from the raw image texture. This returns a texture which, at position (u,v), displays the color seen at virtual camera coordinates $(u,v)=\phi-1\ (x,y)$.

As shown in FIG. 12Aa vertex shader (e.g., a program executed by a graphic processing unit as part of the rendering pipeline) computes a sparse mesh for the optical element of the display system. A mesh or lattice representing the reflective surface of the optical element (e.g., at least eye image regions of an optical visor reflecting light from the display screen to the eyes of a user) is projected onto a virtual digital imaging device implemented as part of the imaging process. In one example, a virtual camera, such as a unit-focal-length virtual camera is used. The camera is positioned at coordinates to correspond to with the position of an eye of the wearer of the display system. For example, the camera is positioned with a view direction relative to the mesh that is the same as that of the eye of a user wearing the display system. The output from the virtual camera (e.g., a pixelated image) is used to produce the sparse mesh—as shown in FIG. 5 described above, for example—whose attributes are: (i) position of its vertices in real world coordinates (x, y, z), (ii) normal direction in world coordinates (normals), and (iii) position in eye coordinates (vertices for x and y).

As shown in FIG. 12B, the sparse mesh with corresponding data of (i) position (x,y), (ii) normals, and (iii) vertices for x and y with the screen model are input to a fragment shader (e.g., a program executed by a graphic processing unit as part of the rendering pipeline). The fragment shader computes, pixel by pixel, the forward distortion mapping $\phi$: $(x,y) \mapsto (u,v)$. The result of this computation is a two-channel, floating-point texture whose values range over the width and height of the screen. A suitable buffer size M is selected, as described later in this paragraph. Two b-bit (where $2^b \geq \max(m, n)$, if the screen is m-by-n pixels) floating-point pixel buffers of size M-by-M are selected Each pixel in the buffer then interpolates the attributes (position and normal of the position) of the mesh vertices in the image plane surrounding the pixel. As described above, these attributes are used to compute the two (u,v) pixel coordinates corresponding to the point of intersection of the reflected ray (e.g., V_out in equation 2) with the screen to generate the forward distortion map. In one example, to prevent loss of resolution by the unwarping, a buffer size M should be selected so that adjacent pixel values in the buffer do not differ by more than 1. For example, unless the point of corresponding curvature of the optical element is very great, M may be selected between 1 and 4 times the pixel resolution of the screen.

In FIG. 12C, the forward distortion map is input to another vertex shader (a program executed by a graphic processing unit as part of the rendering pipeline). The vertex shader samples (e.g., using texture sampling function of a CG libraries) a sparse regular lattice over an invertible region of the mapped two-channel, floating-point texture.

This region is said to be invertible because no two pixels therein should map under $\phi: (x,y) \mapsto (u,v)$ to the same u, v coordinates. The attributes of the sparse lattice are (i) the lattice coordinates x and y, and (ii) the sampled texture values u and v corresponding to the lattice for the region over which the map is invertible. In one embodiment, the contiguous invertible region that covers the largest portion of the FOV of display system is selected. In one embodiment, it is selected by throwing out points for which the partial derivatives du/dx and dv/dy are not positive. This ensures monotonicity, which in turn ensures invertibility. The sparse regular lattice (e.g., the lattice of points (xi, yi), shown in FIG. 9A) augmented with a forward distortion map can be interpreted as a warped lattice augmented with an with inverse distortion map by swapping the image (u,v) and preimage (x,y) attributes. For example, vertex $(x_i, y_i)$ of the sparse regular map is augmented with the datum $(u,v)=\phi(x,y)$.

In FIG. 12D, the lattice coordinates x and y, and the sampled texture values u and v, corresponding to the lattice coordinates x and y, are input to a new fragment shader. The fragment shader interpolates, in screen coordinates, the preimage attributes of surrounding vertices of the sparse map, to densify or increase the resolution of the sparse mapping according to equation 3 by $\psi_L : \phi(I) \to I$. The result of the interpolation is an inverse distortion map comprising a two-channel floating-point texture whose values range over the user's field of view. The inversion map is then saved in a memory accessible during the rendering process to be applied to an image to pre-warp the image during rendering. For example, the inverse distortion map may be stored as a lookup table, using a png RGBA 8-bit format. For each pixel in a full-screen image, the U value is encoded by the first 16 bits (R and G) and the V value is encoded in the next 16 bits (B and A).

Having determined the inverse distortion map, the inverse distortion map may be used in the rendering process of images by the display system to guide rendering of a "pre-warped" image. For example, in operation (e), during rendering of an image, the image data and inverse distortion map are input to a fragment shader. For each screen pixel (u,v), the fragment shader "looks up" the corresponding x, y-coordinates of the desired target pixel. The desired image is then sampled (e.g., interpolated) for the modelled eye coordinates applied to the screen pixel, and the pre-warped interpolated RGB data is applied to said screen pixel. In one example, bilinear interpolation may be used. The screen pixel illuminates, and the pre-warped light is reflected and warped by the optical element thereby correcting or cancelling distortion from the pre-warped displayed screen image resulting in an undistorted image perceived by the viewer of the display system. For example, an eye of the user situated at the modeled eye coordinates perceives what is consistent with a flat screen, normal to the direction of the modeled eye, where a flat screen is considered to display the desired image.

In one embodiment, the fragment shader is run for each pixel in parallel. For each pair (u,v) of screen coordinates, the shader returns a color, which may be determined as follows. The shader samples the inverse distortion map (i.e., the dense inverse distortion map resulting from operations shown in FIGS. 12A-D) at the coordinates for the pixel, determines a pair of image plane coordinates corresponding to the inverse distortion map, and samples the desired image at the determined image plane coordinates which returns the color for display by the screen of the display device.

In one embodiment, the shaders of the GPU perform all operations in floating-point arithmetic, or an equivalent arithmetic which represents coordinate maps with sub-pixel accuracy (e.g., coordinates that differ from the true map by less than the width of one pixel) so that resampling does not introduce any undue aliasing artifacts during the rendering process.

The operations (a)-(e) provide a technical solution to the distortion introduced by the optical element of the display system without the need for any additional optics to correct for the distortion. As the process is implemented by the processing device of the display system, additional weight and bulk are also avoided providing enhanced comfort for a user wearing the display system. In addition, by removing the distortion, the AR experienced by the user is enhanced as virtual images may be more accurately rendered in to conjunction with the user's environment, and virtual objects may be more easily interacted with by a user exploring and manipulating the augmented environment.

System Components

FIGS. 13A, 13B, 13C, 13D, and 13E show examples of an optical display system implemented as a head mounted display (HMD) system 1300 for augmented and virtual reality applications to provide a synthetic or virtual image within a 3D virtual environment by a user wearing the HMD.

Figure 13A:
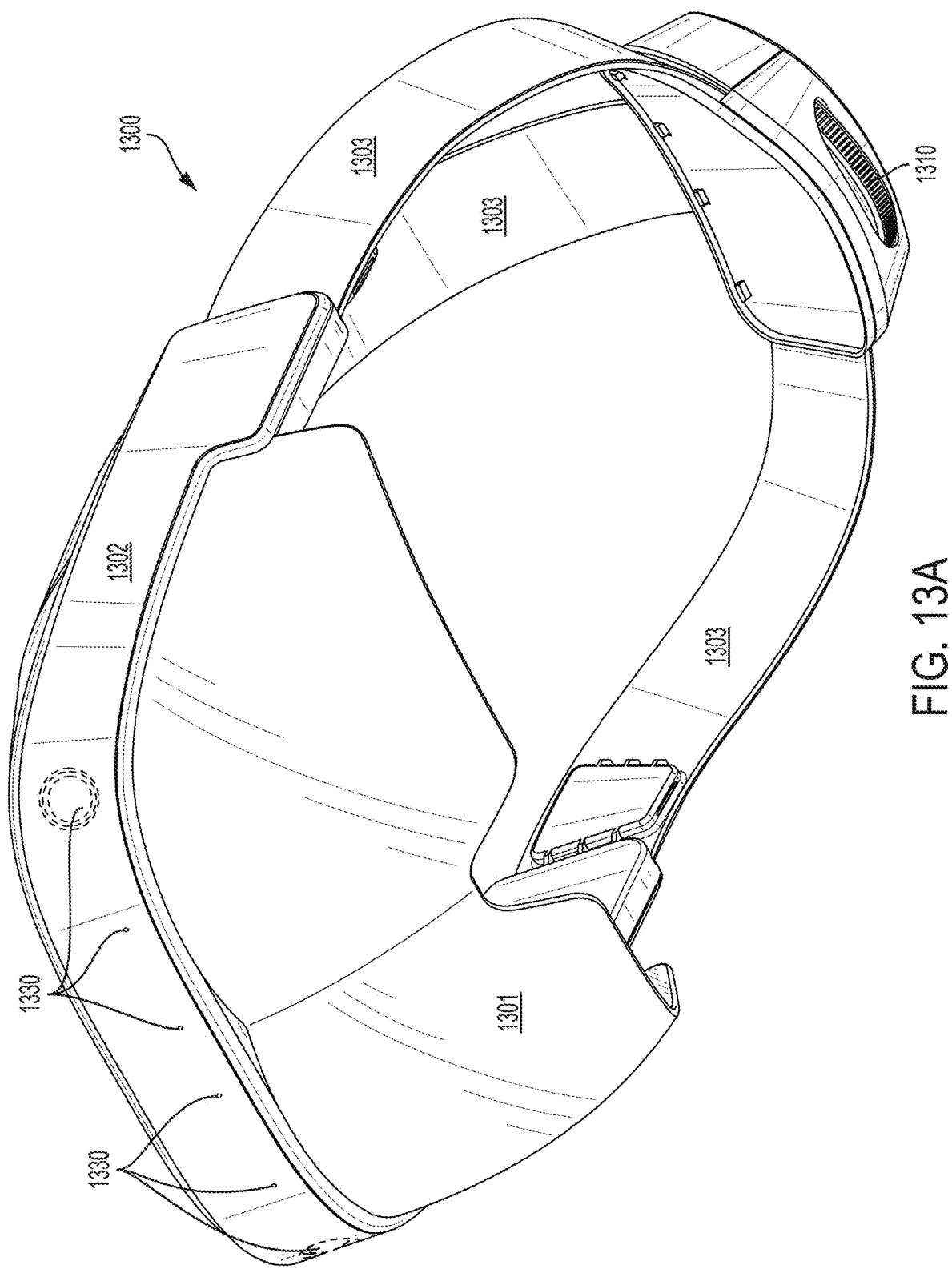
FIGS. 13A, 13B, 13C, 13D, and 13E show examples of a head mounted display implementation of the computation and applying distortion maps.
Figure 13B:
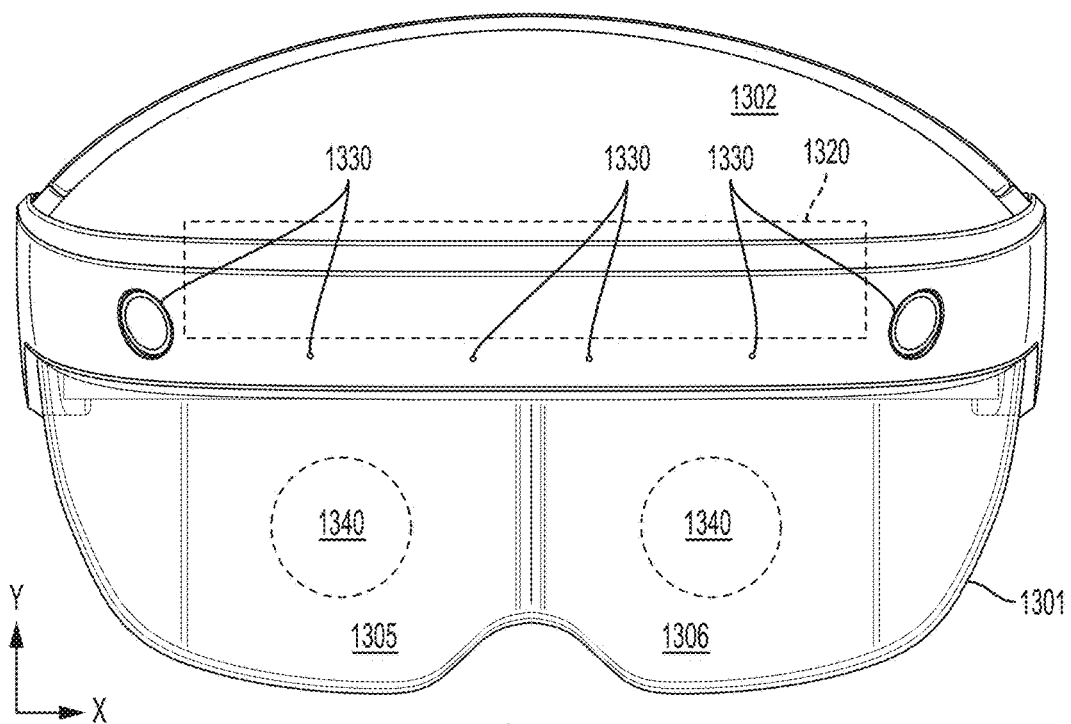
Figure 13C:
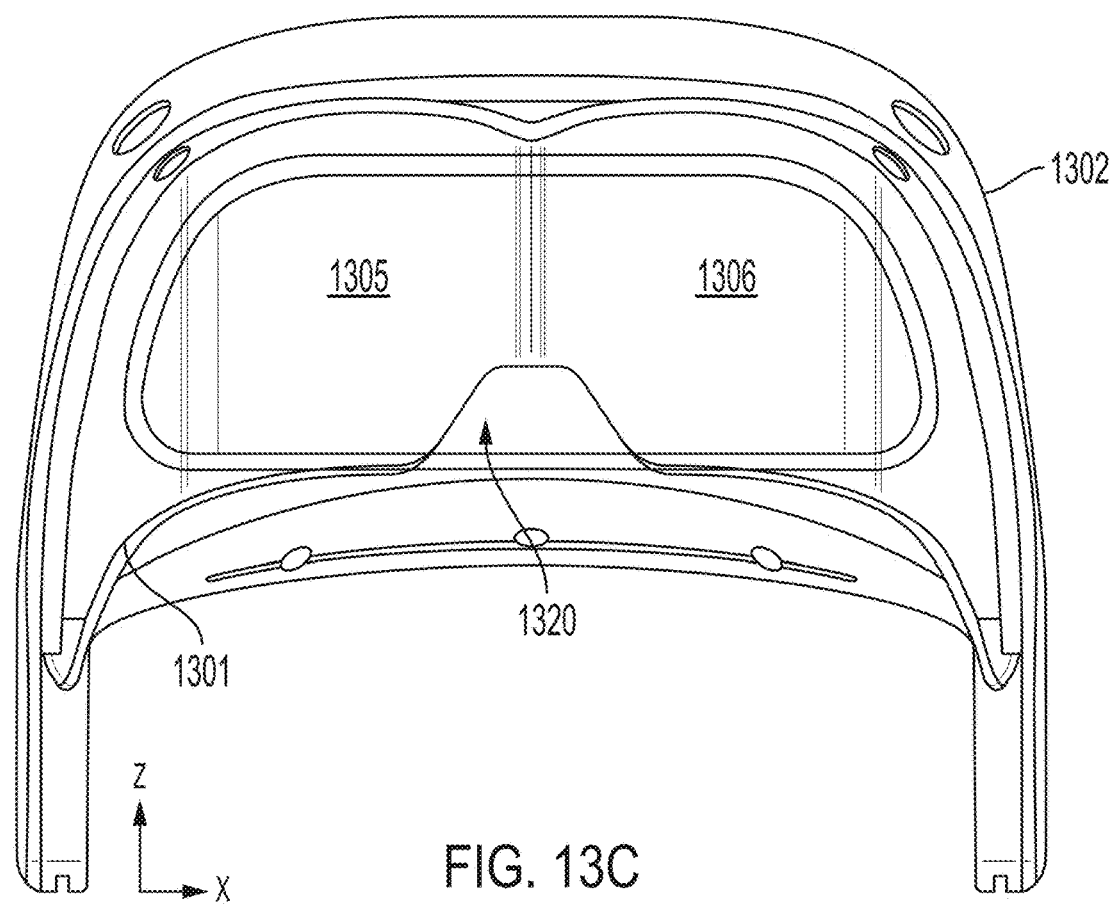

FIGS. 13A, 13B, 13C shows a perspective view, front view, and bottom view, respectively, of one example of an HMD 1300. As shown the HMD includes a visor 1301 attached to a housing 1302, straps 1303, and a mechanical adjuster 1310 used to adjust the position and fit of the HMD to provide comfort and optimal viewing by a user of the HMD 1300. The visor 1301 may include one or more optical elements, such as an image combiner, that includes a shape and one or more reflective coatings that reflect an image from an image source 1320 to the eyes of the user. In one example, the coating is partially reflective allowing light to pass through the visor to the viewer and thus create a synthetic image in the field of view of the user overlaid on the user's environment and provide an augmented reality user interface. In another example, the coating reflects light from the image source but does not allow light to pass through the visor to the viewer and thus create a virtual image in the field of view to provide a virtual reality user interface The visor 1301 can be made from a variety of materials, including, but not limited to, acrylic, polycarbonate, PMMA, plastic, glass, and/or the like and can be thermoformed, single diamond turned, injection molded, and/or the like to position the optical elements relative to an image source and eyes of the user and facilitate attachment to the housing of the HMD.

In one implementation, the visor 1301 may include two optical elements, for example, image regions 1305, 1306 or clear apertures. In this example, the visor 1301 also includes a nasal or bridge region, and two temporal regions. Each image region is aligned with the position 1340 of one eye of a user (e.g., as shown in FIG. 13B) to reflect an image provided from the image source 1320 to the eye of a user of the HMD. A bridge or nasal region is provided between the two image regions to connect the two regions 1305 and 1306. The image regions 1305 and 1306 mirror each other through the y-z plane that bisects the nasal rejoin. In one implementation, the temporal region extends to an outer edge of the image region wrapping around the eyes to the temple housing of the HMD to provide for peripheral vision and offer support of the optical elements such that the image regions 1305 and 1306 do not require support from a nose of a user wearing the HMD.

Figure 13D:
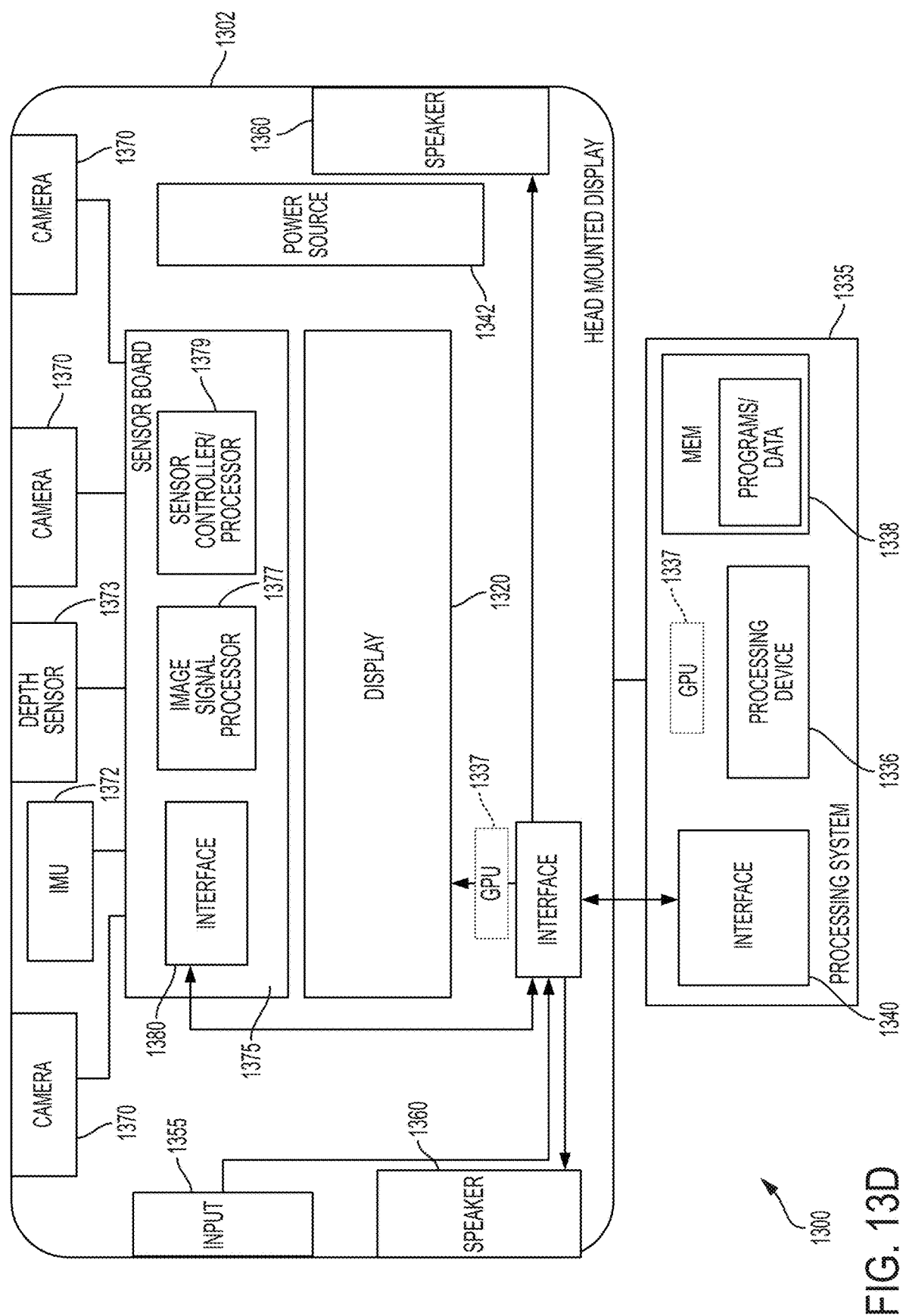
Figure 13E:
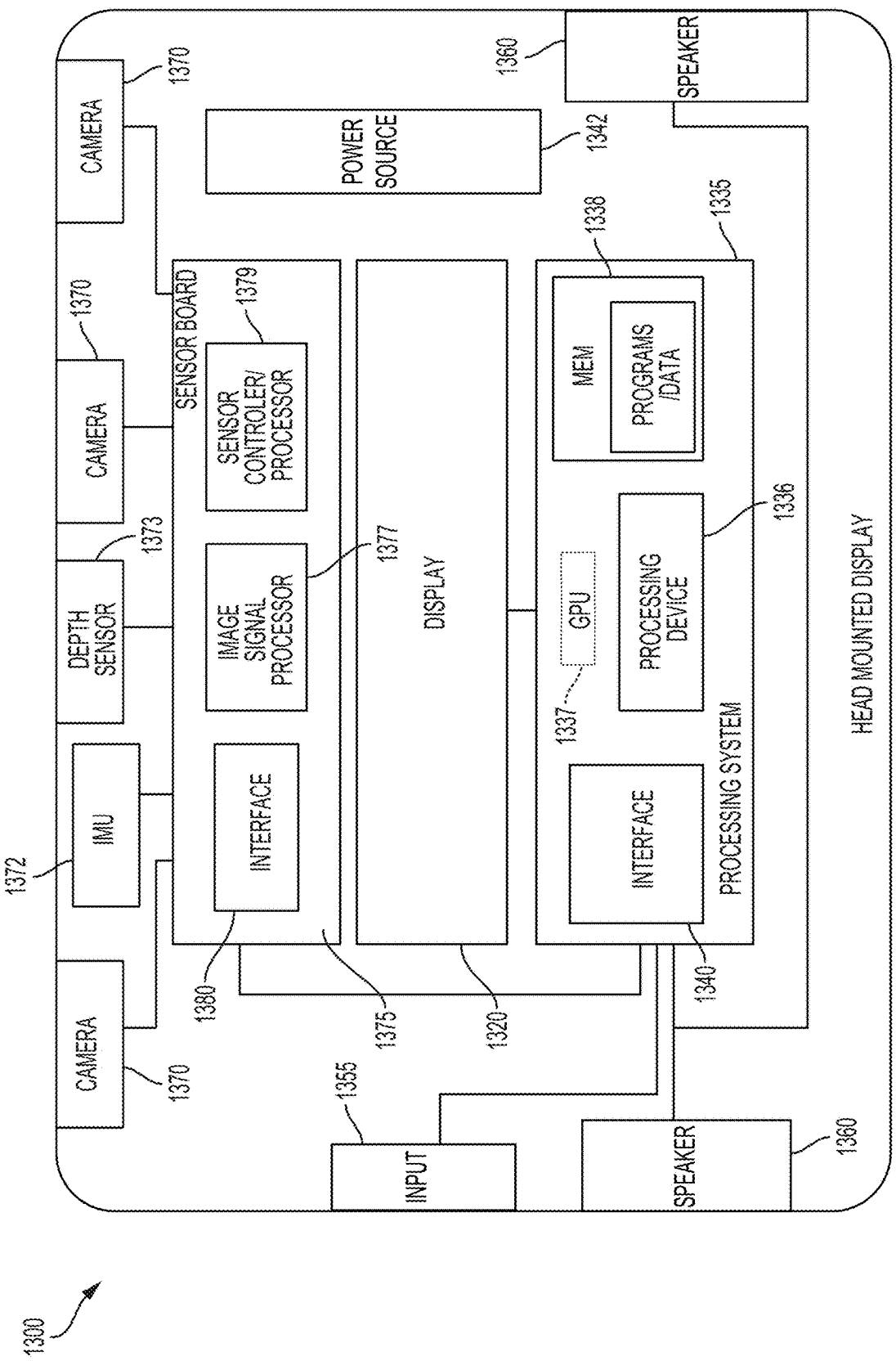

In one implementation, the housing may include a molded section to roughly conform to the forehead of a typical user and/or may be custom-fitted for a specific user or group of users. The housing may include various electrical components of the system, such as sensors 1330 and the image source 1320. The HMD also may include a processing system 1335. The processing system may include one or more processing devices, such as, for example, a processing device 1336 (e.g., a central processing unit) and graphics processing unit (GPU) 1337, in addition to one or more storage devices 1338, and interface 1340. The processing system 1335 may control operations of the HMD such as displaying/rendering images on the display device (including implementing the inverse distortion process explained above), processing sensor information from the sensor array, and manipulating the various system components. FIG. 13D shows an example of an implementation in which the processing system 1335 is implemented outside of the housing 1302 and connected to components of the HMD using an interface 1345 (e.g. a wireless interface, such as Bluetooth or a wired connection, such as a USB wired connector). As shown in FIG. 13D the graphics processing unit may be implemented as part of the processing system or separately in the housing 1302 (e.g., on a graphics board associated with the display). FIG. 13E shows an implementation in which the processing system 1335 is implemented inside of the housing 1302. The one or more storage devices 1338 may store data (such as image data used to create virtual images by the display system and inverse distortion maps). In addition, the storage device 1338 may storage computer readable instructions that are executed by the processing devices to perform various operations and functions. For example, the storage device 1338 may storage computer readable instructions that implement the inverse distortion process described above.

The HMD 1300 also includes a power source 1342 (e.g., such as a battery, power interface, or power supply) to provide power to the HMD components. Various inputs 1355 (e.g., buttons and controls) and outputs 1360 (e.g., speakers) are provided to allow user input control signals to the HMD 1300 and provide output signals (e.g., audio, music, sound effects, among others) from the HMD 1300.

The housing also positions the visor 1301 relative to the image source 1320 and the user's eyes. In one example, the image source 1320 may be implemented using one or more displays. For example, the image source may be a single display. If an optical element 1305, 1306 of the visor is provided for each eye of a user, the display may be partitioned into at least two halves. For example, each half may display an image intended for a separate eye. In another example, two displays may be provided. In this example, each display is paired with a corresponding optical element or image area, where each pair provides an image to an eye of the user. Examples of displays include a liquid crystal display (LCD), a Light Emitting Diode (LED) display, a flexible organic LED (OLED) display, and a Liquid Crystal on Silicon (LCoS or LCOS). In one example, a single 4.5- to 5.2-inch diagonal Liquid Crystal Display (LCD) may be used. In another example, dual 2.8-3.4-inch diagonal LCDs, one for each eye, may be used.

In one implementation, the display may be part of a mobile phone or other mobile device that is separate from, but placed within and/or affixed to, the HMD and/or HMD housing and is subsequently detachable or removable therefrom. For example, a user-accessible opening may be provided to accept and position a mobile phone or other mobile device with a display to provide an image source for the HMD. In this example, a hatch or a slot is configured to accept the mobile phone or other mobile device and provide access to a guide, a rail, one or more walls, or a shelf to position the display of the mobile device or mobile phone outside the field of view and at the geometries according to the descriptions and examples provided herein. In yet another example, an opening may provide one or more fasteners, such as a clip or deformable member that accept and detachably lock and position the display of the mobile device or mobile phone outside the field of view and at the geometries allowing reflection to the user's eyes.

The housing 1302 positions one or more sensors of a sensory array 1330 that detect the environment around the user. In one example, one or more depth sensors are positioned to detect objects in the user's field of vision.

As shown in FIGS. 13D and 13E, the HMD includes a sensor array 1330 includes cameras 1370, an IMU 1372, a depth sensor 1373, a sensor board 1375, an image signal processor 1377, a sensor/controller processing device 1379, and an interface 1380 to communicate with the processing system 1335.

The sensor array includes a mechanical holder and/or assembly that holds, arranges, and positions a plurality of sensors. For example, the mechanical holder accepts and holds the sensors securing the sensors to the housing of the HMD. In addition, the mechanical holder positions, arranges, and or configure the sensor to sense the user's real world environment as described in further detail below. The mechanical holder may be implemented as a single element, or be assembled from several elements. In one example, the holder holds, arranges, and positions at least three sensors, such as cameras.

A camera includes an image sensor, a lens, and a mechanical fixture (e.g., a lens holder) that holds the lens on the image sensor. The lens holder positions the lens to direct rays of light onto the surface of the image sensor. The lens is an optical unit that can concentrate and direct the light rays on the Image Sensor. In one example, an image sensor is a device, typically made of CMOS or CCD semiconductor technology that consists of an array of light sensitive elements or "pixels." The light detected may be any electromagnetic radiation sensed by the elements, such as, for example, light in the visible spectrum, the infra-red spectrum or the ultra-violet spectrum to which the sensor is attuned. The camera can provide video or still images. As shown in FIG. 1, the cameras include a monochrome camera, a color camera, and a depth camera.

In one example, the sensor array includes two monochrome ("mono") cameras 1370. The mono cameras include an image sensor that is optimized for sensing monochrome/grayscale/black-and-white light information (e.g., grayscale video, grayscale still images, etc.). Alternatively, more than two mono cameras can be used. The image sensors are paired with lenses that have a wide field of view (FOV), such as, for example, a fisheye lens that can support an FOV of approximately 140 to 180 degrees, when matched with a compatible image sensor. In one example, the lenses may have a substantially the same FOV, such as, for example, approximately 160 degrees.

In one implementation, the mono cameras may be configured to sense features of the user's real world environment. For example, the mono camera may be use to capture images depicting corners, texture patterns, high frequency textures, lines, sharp edges or other similar entities that can be tracked via computer vision algorithms. Examples of features include Harris corners, Sobel edges, Canny edges, KLT features/Good Features To Track, Features from accelerated segment test (FAST) features, (Oriented FAST and Rotated BRIEF) ORB, Simultaneous localization and mapping (SLAM), BRISK, SURF features and the like.

The detected features are processed by computer vision algorithms of various applications implemented by the processing devices 1336 to sense the user's real world environment. For example, information obtained from the mono cameras is used for pose estimation. The techniques that enable pose estimation, such as Visual-Inertial Odometry/Navigations, SLAM, Visual-Inertial SLAM, and the like. In one example, to support these techniques (e.g., techniques that track features where the features do not appear to have moved significantly between frames), the mono cameras have a frame rate of at least 60 frames per second. Of course, higher frame rates (e.g., 120 and greater) may be used when suitable computational resources support these rates.

The mono cameras may be arranged by the mechanical holder to provide different area of coverage of features within the real world environment relative to the user. Examples of various configurations of the mono cameras is discussed in further detail below.

In one example, the sensor array includes at least one depth sensor 1373. The depth sensor includes a depth image sensor that senses the distance of an object/scene within the real world environment of the user. For example, the depth image sensor senses the distance for each pixel of the image sensor.

In one example, the depth sensor is a Time of Flight (TOF) Camera. For example, the camera includes a light emission device or projector and measures the time between the emission of light from the device and the returned reflection of light from a real world object that is detected by the image sensor, which is referred to as time of flight depth sensing. In one example, the light projector emits a pre-defined pattern, and the depth of the scene images captured by the camera are algorithmically converted to a depth image where each pixel contains the depth of the scene (e.g., structured light depth sensing). In one example, the TOF camera includes a wide-angle lens. For example, a lens with angle of greater than 100-120 degrees in order to sense an environment similar to that perceived by the vision of a user observing their environment.

In another example, two or more cameras may be used to form a stereo pair (e.g., using two cameras) or an N-Camera Rig (e.g., using N cameras) that generate video feeds that are algorithmically combined together to yield a depth image (e.g., passive stereo depth sensing). Stereo depth sensing also can be assisted by a light projector that emits a pre-defined pattern and/or a speckle pattern onto the scene to be sensed allowing surfaces with a poor texture (e.g., surfaces that do not demonstrate high-resolution texture) to improve the quality of algorithms used to acquire stereo depth. This is referred to as active stereo depth sensing.

The output depth images from the depth camera are used for Hand Tracking and Environment Sensing. In addition, the output may be used for Semantic Recognition and Pose Estimation. The output from the depth sensor is used as an input for Hand Sensing. For example, the depth sensor provides depth values that allow motion of hands and their interaction with digital content to be determined. In addition, the output from the depth sensor is used as an input for Environment Sensing. For example, the depth sensor provides a representation of the user's environment to form of point clouds of data points, a depth map of environment features, and/or three-dimensional (3D) meshes of the environment of the user. Furthermore, the depth sensor also can assist other processes, such as Semantic Recognition by sensing information about the shapes of objects and scenes used to differentiating characteristics of the object or the scene. Finally, the Depth Sensor can provide additional data as input to Pose Estimation resulting in determinations that are more robust. For example, the depth data allows the implementation of RGBD SLAM algorithms that combine RGB data with depth information, depth-based SLAM algorithms (such as Kinect Fusion), and also can aid estimation of a scale factor of the trajectory of a monocular Slam and/or Visual Inertial Navigation system.

User hand positions can change quickly. At the same time, the interaction of the user's hands with the virtual environment should appear smooth to the user. Therefore, in one example, the depth sensor has a frame rate that captures depth images at least 60 frames per second for hand sensing. However, other depth sensing solutions typically need more power to be able to sense objects that are relatively far from the user. Therefore, for given power consumption, the depth sensor provides a limited sensing range in terms of depth. In order to be able to sense the environment (e.g., Environment Sensing), as well as hands (e.g., Hand Sensing), the depth sensor supports a long-range mode that operates at a rate lower than 60 frames per second. The lower frame rate limits the power consumption of the sensor. In one example, a frame rate of 15 frames per second may be used in long range sensing. The depth sensor may be controlled to sense information at both a short ranges (e.g., hands) and long range (e.g., environment). In one example, the sensor may be controlled to operate in different modes, such as for example, a hand-range mode, a long-range mode, or at an interleaved mode where the sensor returns two depth feeds simultaneously (e.g., every $\frac{1}{60}$ sec provides a near-range image and every $\frac{1}{15}$ sec provides a long range image).

In one example, the sensor array 1300 includes a color camera (e.g., one of the cameras 1370) that senses color information (e.g., can transmit color video, color still images). Alternatively, more than one color camera can be used. In one example, the color camera is an RGB camera that includes an image sensor that encodes color information using red, green, and blue channels. The RGB camera includes a wide-angle lens, for example, a lens with an angle greater than 100-120 degrees. In one example, the camera acts as an action camera that mimicking the wide FOV of the human eye.

In one example, the RGB camera has a resolution high enough to convey a user's experience accurately. One skilled in the art will appreciate that a high resolution can be computational intensive if the same camera is used for computer vision processes. Therefore, in one example, to mitigate use of computation resources, the feed from the camera may be scaled to a lower resolution (e.g., using algorithms that are implemented in software or hardware).

In one example, the RGB captures images at a speed of at least 30 frames/second, which is the minimum requirement for persistence of vision of conveyed video. A frame rate of at least 60 frames/second provides a more natural-like visual experience and is able to capture faster user motions. In one implementation, the RGB camera can be switched between frame-rates, depending on the available computational resource to process the output data.

In one example, the RGB camera's provides a point of view (POV) Video. For example, the POV Video may be used to convey the user's experience to another user or device for applications, such as, for example, remote assistance, documentation, recording, cinematography, or any other similar or different application that requires a video stream with or without digital graphics overlaid. In addition, output from the RGB camera can be used to assist Pose Estimation by generating data for a SLAM or Visual Inertial Navigation algorithm. This adds more robustness to these algorithms due to the overlap of the FOV of the RGB camera with the area sensed by the mono cameras and due to the smaller FOV that allows the motion of tracked features to be captured in more detail (e.g., with higher sensitivity). For example, the mono cameras have a relatively very wide FOV and therefore may be have fewer pixels per degree of FOV; whereas, and the RGB camera has more pixels per degree because of its smaller FOV. In another example, the RGB camera can be used to apply color information to the geometric data that Environment Sensing recovers. In addition, data from the RGB camera can assist with Hand Sensing, for example, as input to hand segmentation and hand detection algorithms. In addition, data from the RGB Camera can support RGBD SLAM algorithms that allow features to be tracked using the RGB data and correlation of those features with a depth value supplied by data from the depth sensor. In yet another example, RGBD SLAM supports Pose Estimation by utilizing both the RGB tracked features and their depth. For example, depth may be assigned to the RGB features using the data from camera calibration for the extrinsic parameters, a process where the relative position and orientation between two cameras is estimated.

The sensor array 1330 may include an image signal ISP processing device (ISP) 1377. An ISP is an image processor that may be implemented using a specialized digital signal processor (DSP) used for processing the raw feed of images from RGB camera. The RGB camera, as a POV Video device, is required to generate data that are aesthetically appealing to viewers of the POV Video stream. In one example, this is accomplished by an image processing pipeline to process the raw data received from the sensor. The ISP employs parallel computing to increase speed and efficiency and perform a range of tasks. For example, the ISP performs processes, such as Black Level Adjustment, Noise Reduction, White Balance, Debayering/Demosaicing, RGB blending, Gamma Correction, RGB conversion to other formats such as YUV, edge enhancement, Contrast Enhancement, False Chroma suppression, and like. Because the ISP performs these operations in a dedicated computational device, the Host System relieved of this computational load.

The sensor array 1330 includes an Inertial Measurement Unit (IMU) 1372. The IMU includes a gyroscope, an accelerometer, and a directional sensing device (e.g., magnetometer or compass). The gyroscope provides data used to sensing the angular velocity of the user. The accelerometer provides data used to determine linear acceleration of the user. The magnetometer or compass may detect magnetic fields used to determine a direction a user is facing.

In one example, data provided by the IMU is used in Pose Estimation by providing real-time data to the SLAM and Visual-Inertial Navigation, as part of a sensor fusion system that fuses visual data with gyroscope and accelerometer data. In one example, the IMU is positioned and oriented behind one of the mono cameras in order to facilitate the extrinsics (e.g., parameters that define the relative position and orientation between two sensors) calibration processing in production and algorithms. In one example, the IMU has a high frame rate, such as at least 400 frames/second. In addition, the IMU has a measure range of, for example, at least plus or minus 2 G for linear acceleration and at least plus or minus 500 deg/sec for angular velocity.

The sensor array also includes a sensor controller processing device (SCPD) 1379 computational system designed to transfer the digital information that each sensor generates to other computational systems for further processing, for example, by computer vision algorithms and applications. In one implementation, a SCPD is configured to receive data input from the mono cameras, the RGB camera (e.g., via the ISP), the depth camera, the IMU, and the thermal sensor. The SCPD may be implemented using one or more of an on-board processing device (e.g., a chip or a chipset), such as a Field Programmable Gate Array (FPGA), an application-specific integrated circuit (ASIC) chip or a general-purpose chipset, or other processing device. The SCPD performs various processes, such as, for example, a sensor array data aggregation process and a sensor array control process. In one example, the computation system or SCPD may be implemented by more than one device, for example, one device may implement data aggregation, and another device may implement sensor control.

In one example, the SCPD aggregates the data from all the sensors into a data stream. The data stream may be provided to the host system via a communications interface. The SCPD is operatively coupled to each sensor to communicate with the sensor. For example, the SCPD includes one or more interfaces (such as MIPI, HiSPi, LVDS, parallel, I2C, and the like) that are coupled to the output of the various sensors to read data from the sensors and/or configure or control the sensors. The SCPD is also coupled with a clock to provide timing for the system and to implement a time stamp. The SCPD may include one or more storage devices, or buffers, which are used to manage the collection and aggregation of the data from the sensors and apply a timestamp to each frame of data received from a sensor. The SCPD continuously reads and buffers data from each sensor. The buffered data is then packaged into a communications format compatible with the interface. The packaged data is then periodically transmitted to the host system as input for the computer vision algorithms and AR applications. For example, the data may be packaged and sent to the host system using interfaces, such as USB3.0, USB3.1, USB2.0, Ethernet, PCI, Thunderbolt, and the like.

The SCPD also controls and configures the sensors. For example, the SCPD sends configuration signals to the sensors to set the sensors to perform sensing using specific settings, such as a frame rate, a data range, a precision, a resolution, and the like. The sensors also may provide feedback and/or acknowledgement signals in response to the controls and configurations.

A communications interface is provided between the sensor controller processing device to facilitate the communication of information, such as sensor data and control signals between the SCPD and the processing system 1335.

As explained in detail above, in one example, the processing system 1335 may be implemented to create the inverse distortion map and execute the inverse distortion mapping process, as described above with regard to FIGS. 12A and 12B. In one example, the processing system 1335 may include a CPU, GPU, and an associated memory storing one or more applications and data used by the system to display images within a 3D virtual environment. In addition, the processing system generates and/or renders digital image data depicting one or more of graphics, a scene, a graphical user interface, a computer game, a movie, content from the Internet, such as web content accessed from the World Wide Web, among others that are to be presented to a viewer of the wearable HMD. Examples of applications includes media players, mobile applications, browsers, video games, and graphic user interfaces, to name but a few. In addition, prior to display of the images, the processing system implements an inverse distortion process to create a pre-warped or distorted image for display by the image source 1320. In one example, the GPU 1337 of the processing system 1335 receives image data for display along with an inverse distortion map corresponding to the optical elements 1305, 1306. The GPU renders the image data to the image source 1320 using, for example, a display buffer (not shown) prior to display according to coordinates indicated by the inverse distortion map to create an image with an pre-warped optical distortion. When the created image is displayed by the image source 1320, the image is pre-warped with an optical distortion that is substantially the inverse of the optical distortion introduced by the optical elements 1305, 1306 such that a viewer of the optical elements of the HMD 1300 perceives an image that is substantially distortion free.

One example of a head mounted display system and components thereof is described in U.S. patent application Ser. No. 14/945,372 titled "Wide Field of View Head Mounted Display Apparatuses, Methods and Systems" filed Nov. 18, 2015, which is herein incorporated by reference in its entirety.

As described above, the techniques described herein for a wearable VR and/or AR system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine-readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as, internal hard disks or removable disks; magneto-optical disks; and CD-ROM and DVD-ROM disks. The processor and the memory can be supplemented by, or incorporated in special purpose logic circuitry.

The HMD may include various other components including various optical devices and frames or other structure for positioning or mounting the display system on a user allowing a user to wear the vision system while providing a comfortable viewing experience for a user. The HMD may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation and storage of data and programs.

In order to address various issues and advance the art, the entirety of this application (including the Cover Page, Title, Headings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A virtual reality or augmented reality head mounted display (HMD) system; the system comprising:
   an image source configured to display an image for viewing by a user of the HMD system;
   an optical element having an optical geometry, wherein the optical element is positioned relative to the image source to reflect light projected from the image source of the HMD system to an eye of a user of the HMD system; and
   one or more processing devices configured to execute instructions that cause the one or more processing devices to:

receive data corresponding to an image for display by the HMD system;
map the image data to pixels of the image source to create an image having a distortion; and
render the mapped image data to the image source to project the image having the distortion, wherein the user of the HMD system perceives a virtual image corresponding to the distorted image that is substantially free of optical distortion.

2. The system of claim 1, wherein the optical geometry of the optical element distorts light reflected from the image source to the eye of the user of the HMD to substantially eliminate or correct the distortion of the projected image from the image source.

3. The system of claim 1, wherein the optical geometry of the optical element distorts light reflected from the image source to the eye of the user of the HMD.

4. The system of claim 1 further comprising a storage device configured to store a map derived from the optical geometry of the optical element, wherein the one or more processing devices are further configured to execute instructions that cause the one or more processing devices to:
access the map; and
apply the map to the image data to render the image data according to coordinates indicated by the map.

5. The system of claim 4, wherein to apply the map the one or more processing devices are further configured to execute instructions that cause the one or more processing devices to:
sample the map at coordinates for each pixel of the image;
determine a pair of image plane coordinates of the image source corresponding to the sampled map; and
sample the image at the determined image plane coordinates to generate a portion of the distorted image for display by the image source.

6. The system of claim 4, wherein the map is derived from a virtual mesh including a plurality of vertices representing the shape or contour of a surface of the optical element.

7. A computer implemented method of rendering an image of a virtual reality or augmented reality head mounted display (HMD) system that includes an image source configured to display an image for viewing by a user of the HMD system and an optical element having an optical geometry, wherein the optical element is positioned relative to the image source to reflect light projected from the image source of the HMD system to an eye of a user of the HMD system, the method comprising:
receiving, by a processing device, data corresponding to the image for display by the HMD system;
mapping, by the processing device, the image data to pixels of the image source to create an image having a distortion;
rendering the mapped image data to the image source to project the image having the distortion, wherein the user of the HMD system perceives a virtual image corresponding to the distorted image that is substantially free of optical distortion.

8. The method of claim 7, wherein a curvature of the optical geometry of the optical element distorts light reflected to the eye of the user of the HMD to substantially eliminate or correct the distortion of the projected image from the image source.

9. The method of claim 7, wherein the optical geometry of the optical element distorts light reflected to the eye of the user of the HMD.

10. The method of claim 7 further comprising:
storing a map derived from the optical geometry of the optical element; and
accessing the map; wherein
mapping the image data includes applying the map to the image data to render the image data according to coordinates indicated by the map.

11. The method of claim 10, wherein to apply the map includes:
sampling the map at coordinates for each pixel of the image;
determining a pair of image plane coordinates of the image source corresponding to the sampled map; and
sampling the image at the determined image plane coordinates to generate a portion of the distorted image for display by the image source.

12. The method of claim 10, wherein the map is derived from a virtual mesh including a plurality of vertices representing a shape or contour of a surface of the optical element.

13. A computer implemented method of configuring a virtual reality or augmented reality head mounted display (HMD) including an optical element reflecting light of an image presented by the HMD system to an eye of a viewer of the HMD system; the method comprising:
determining, by a processing device, a model of a geometry of a surface of the optical element of the HMD system reflecting the image;
determining, by the processing device, a location of the eye of the viewer of the HMD system relative to the optical element;
determining the location of a source of the image relative to the optical element;
mapping, by the processing device, an optical distortion of the image derived from the model, the eye location, and image source location;
mapping, by the processing device, an inverse of the mapped optical distortion; and
configuring the HMD system to apply the inverse mapping when rendering image data for display by the image source to present a distorted image by the image source.

14. The method of claim 13, wherein the mapping of the optical distortion indicates a screen pixel or pixels of the image source corresponding to a ray of light entering the eye of the user.

15. The method of claim 13, wherein mapping the inverse optical distortion is a function of image plane coordinates of the image source relative to the eyes of a user of the HMD to pixel coordinates of the image presented by the image source.

16. The method of claim 13, wherein determining a model of the geometry of the surface of the optical element includes determining a virtual mesh including a plurality of vertices representing the shape or contour of the surface of the optical element.

17. The method of claim 16, wherein the virtual mesh is created using a pinhole visual model, and the virtual mesh is rendered in image plane coordinates.

18. The method of claim 16 further comprising creating, by the processing device, a position map and a normal map from the virtual mesh.

19. The method of claim 16 further comprising, for each vertex in the virtual mesh, determining a position and a corresponding normal vector.

* * * * *